Figure 1:
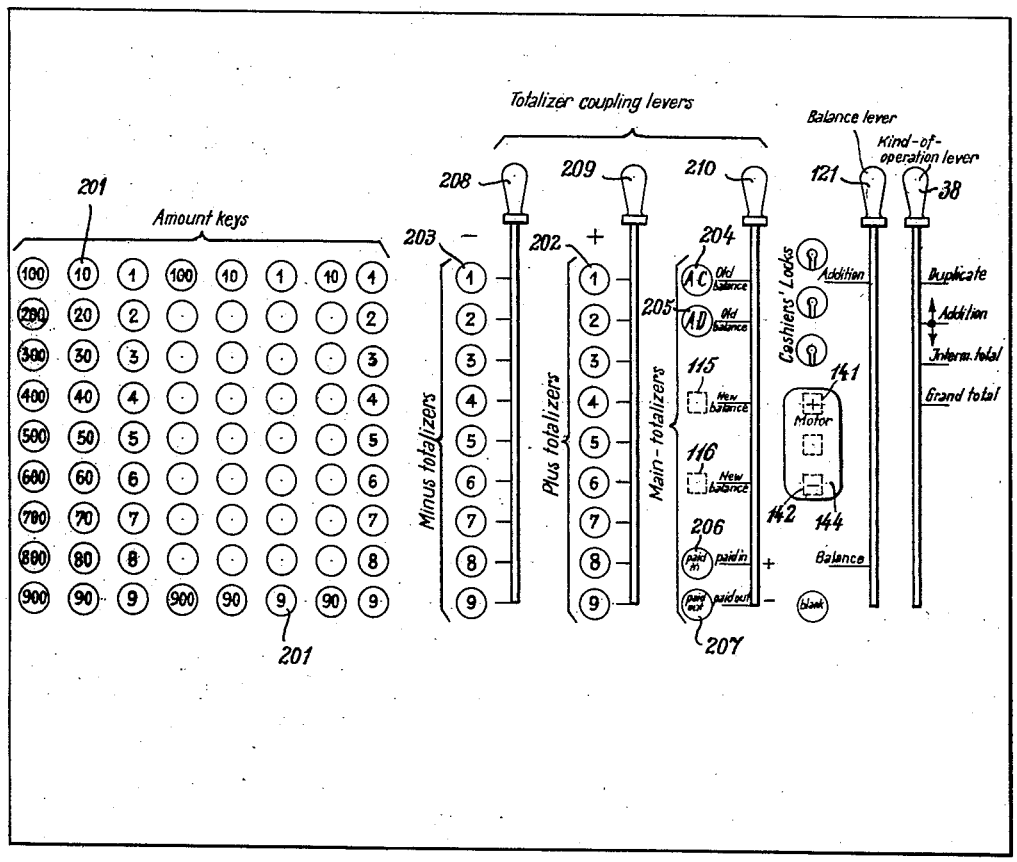

Aug. 25, 1936.  E. BREITLING  2,052,444
BOOKKEEPING MACHINE
Filed March 12, 1931   15 Sheets-Sheet 1

Aug. 25, 1936.    E. BREITLING    2,052,444
BOOKKEEPING MACHINE
Filed March 12, 1931    15 Sheets-Sheet 2
Fig. 2.
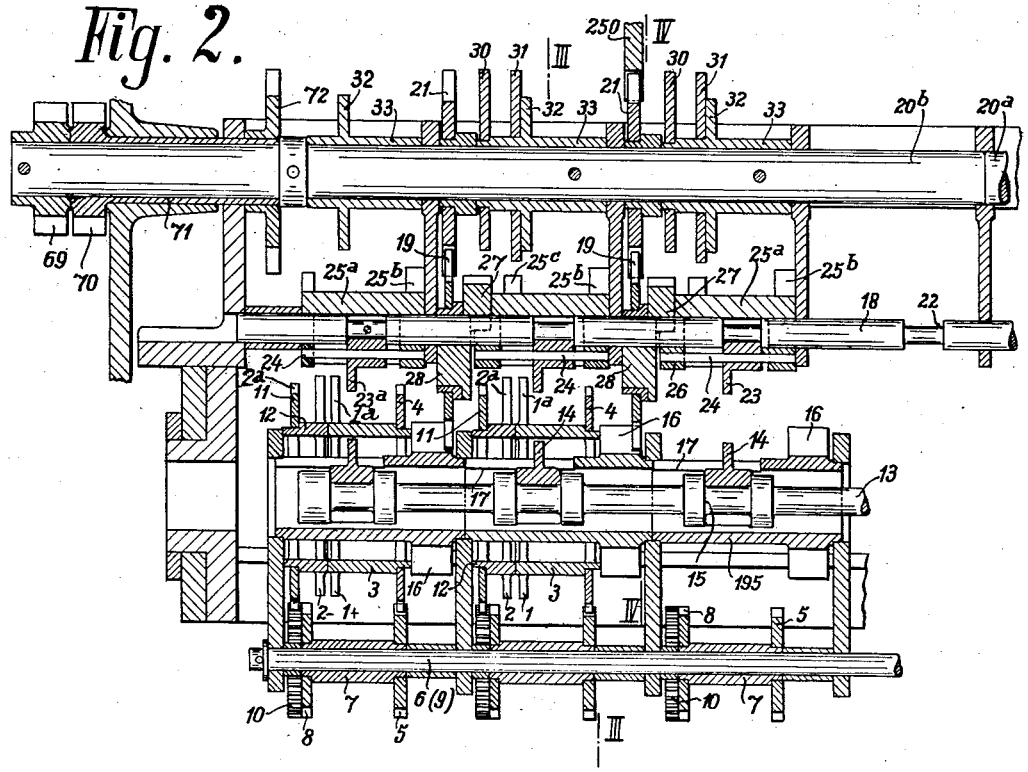
Fig. 2ª.
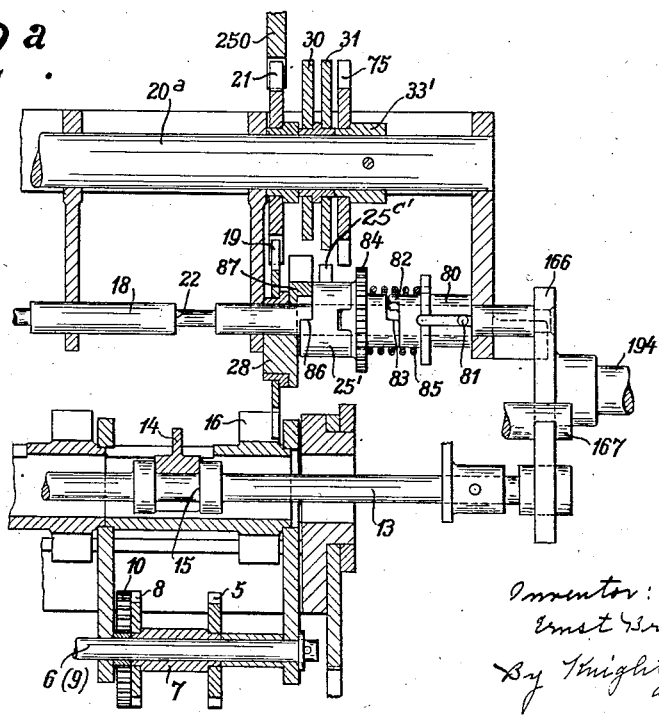
Inventor:
Ernst Breitling
By Knight Bros.
attys.

Aug. 25, 1936.    E. BREITLING    2,052,444
BOOKKEEPING MACHINE
Filed March 12, 1931    15 Sheets-Sheet 3

Aug. 25, 1936.   E. BREITLING   2,052,444
BOOKKEEPING MACHINE
Filed March 12, 1931   15 Sheets-Sheet 4
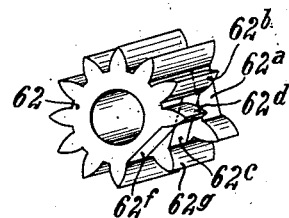
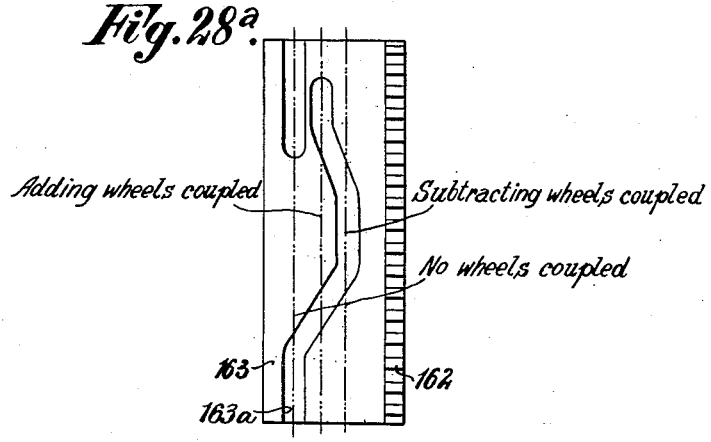
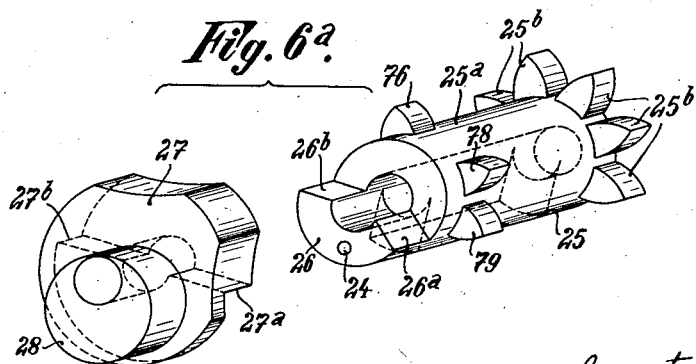

Aug. 25, 1936.   E. BREITLING   2,052,444
BOOKKEEPING MACHINE
Filed March 12, 1931   15 Sheets-Sheet 5

Inventor:
Ernst Breitling
By Knight Bros.
attys.

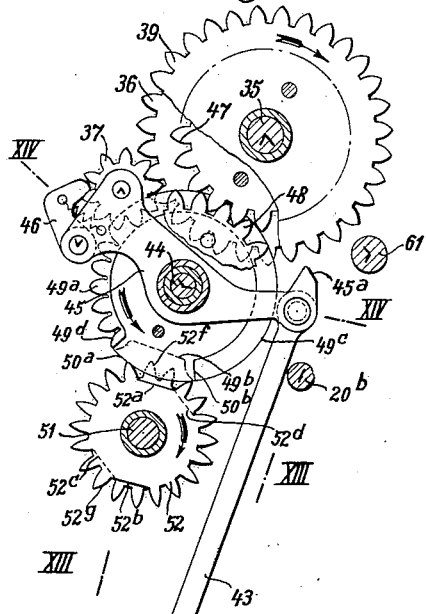

Aug. 25, 1936.  E. BREITLING  2,052,444
BOOKKEEPING MACHINE
Filed March 12, 1931   15 Sheets-Sheet 7
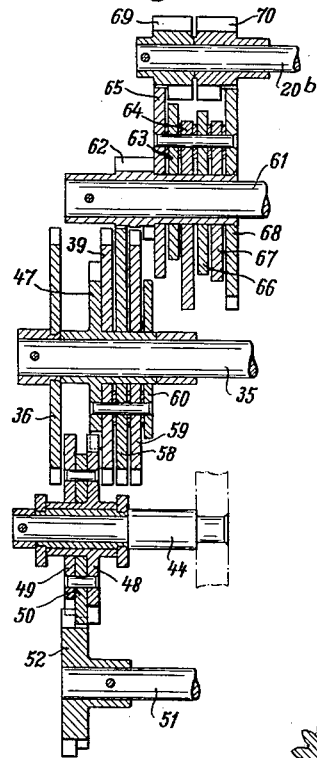
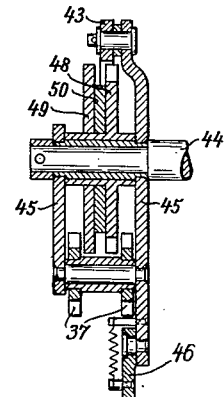
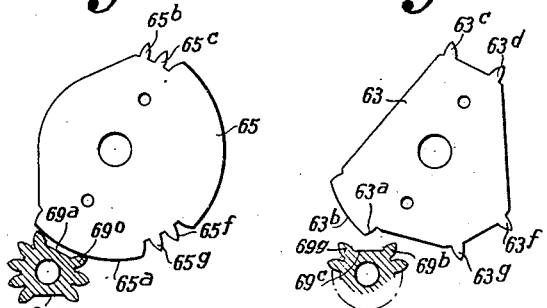
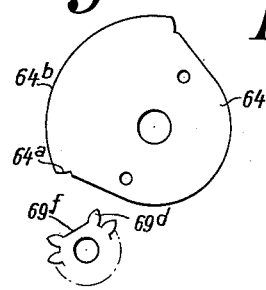
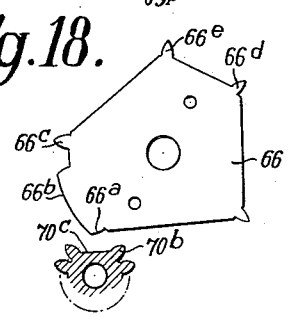
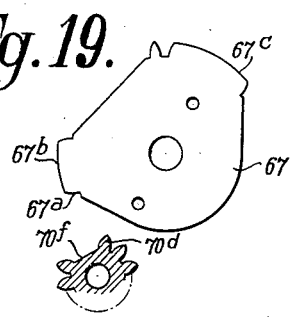
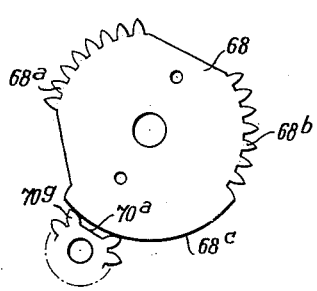

Aug. 25, 1936.                    E. BREITLING                    2,052,444
                              BOOKKEEPING MACHINE
                          Filed March 12, 1931      15 Sheets-Sheet 8

*Fig. 21.*

*Fig. 21ª.*

Inventor:
Ernst Breitling
By Knight Bros
      attys.

Aug. 25, 1936.  E. BREITLING  2,052,444
BOOKKEEPING MACHINE
Filed March 12, 1931  15 Sheets-Sheet 9

Aug. 25, 1936.　　　　　E. BREITLING　　　　　2,052,444
BOOKKEEPING MACHINE
Filed March 12, 1931　　　15 Sheets-Sheet 12

Inventor:
Ernst Breitling
By Knight Bros.
attys.

Aug. 25, 1936.　　　E. BREITLING　　　2,052,444
BOOKKEEPING MACHINE
Filed March 12, 1931　　　15 Sheets-Sheet 13

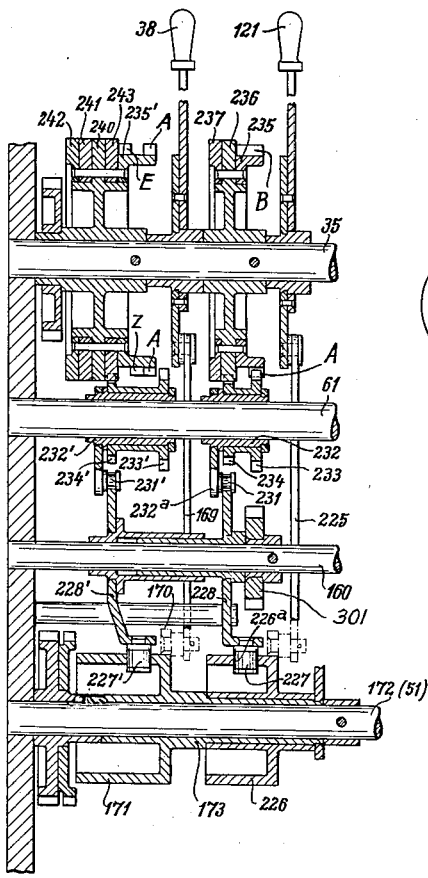
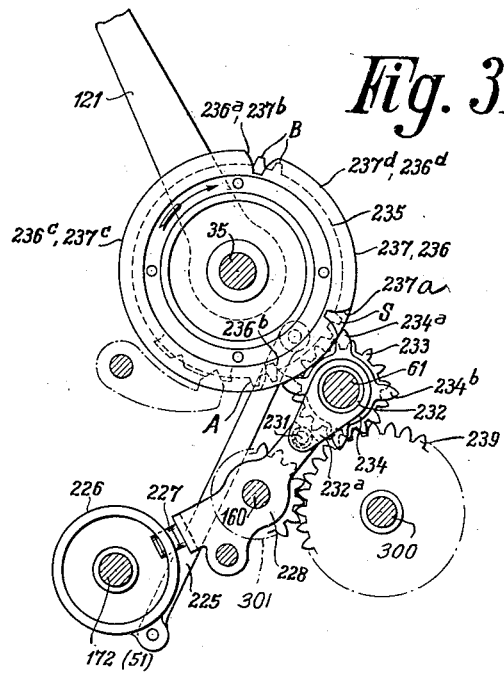
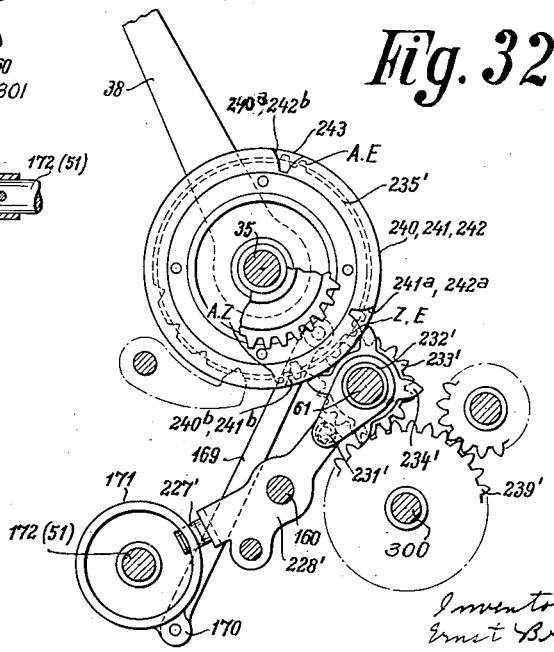

Patented Aug. 25, 1936

2,052,444

UNITED STATES PATENT OFFICE 2,052,444

BOOKKEEPING MACHINE

Ernst Breitling, Essen, Germany, assignor, by mesne assignments, to The National Cash Register Co., Dayton, Ohio, a corporation of Maryland Application March 12, 1931, Serial No. 522,053
In Germany July 12, 1930

44 Claims. (Cl. 235—2)

The invention relates to a book-keeping machine intended for the calculation and recording of new balances resulting from old balances of an account and the amounts received and paid out. A balance mechanism, which in known manner comprises two kinds of counting wheels, viz. adding and subtracting wheels, serves for the calculation of the new balances.

The invention resides in the fact that in all booking operations the coupling of the adding or subtracting wheels with the differential wheels is effected immediately by the depression of the motor key. The selection of the adding or subtracting side of the balance mechanism in the machine operations, serving to record the amounts set up on the keyboard (old balance, amounts paid in or out) takes place simultaneously with the depression of a key by which a control totalizer is thrown into operation. The keys "paid in" and "paid out" of these control totalizers serve further to unlock keys that serve to throw secondary totalizers for debit and credit accounts into cooperation.

In taking the total from the balance mechanism (new balance) the coupling of the adding or subtracting side selected in the preceding machine operation by the balance mechanism itself is prepared by setting a "balance lever" and is carried out by depression of the motor key, that is without any special maniplations, the respective one of the two control totalizers which serves to accumulate new negative or positive amounts being likewise selected automatically and coupled and the respective printing character being selected and printed.

On taking totals only one totalizer may be coupled. In taking the total from one of the totalizers the balance mechanism normally coupled therewith by depressing the motor key is uncoupled. According to the invention this is effected by setting the "kind-of operation" lever.

The amount accumulated in the balance mechanism may be positive or negative, the positive amounts being accumulated in the adding wheels, while the negative amounts are accumulated in the subtracting wheels. Both these sets of wheels thus may work alternatively as main counting wheels or as companion complementary wheels. As the two wheels of each order are in a set position which is complementary to 9, and every complementary amount in the companion counting wheels is always by one unit smaller than the decadal complementary amount required for the execution of the subtracting operation by addition of the complementary amounts, in the passage of the total accumulated in the balance mechanism from positive into negative condition or inversely, that is upon the counting wheels changing, the unit failing in the companion counting wheels is added by a correcting mechanism which upon the number 99999 being exceeded causes in the companion counting wheels a transfer of the 1-correction to the units order, while upon the number 99999 being exceeded in the main counting wheels, that is upon the cacity of the balance mechanism being exceeded, the transfer of the 1-correction to the tens transfer pinion of the units order is prevented. A mechanism which operates the same in principle, but which is of different form, is described in the United States Patent to Bornkessel et al., No. 1,896,936, of February 7, 1933. According to the invention, the actuation of the tens transfer pinion of the units order, which actuation is caused only upon the positive or negative condition of the counting wheels of the balance mechanism changing and serving to transfer the additional unit, is effected by an additional revolution of a step shaft, the first revolution of which serves to cause the normal tens transfers.

With credit entries impressions are made on receipt forms which are printed in lieu of a book. These entries are later entered in the book itself when the book is available. When in a booking operation the account sheet is not present, the respective impression is made on a spare sheet and the impression on the main sheet is likewise made later on. In these later booking operations the old balance and the entry "paid in" or "paid out" is likewise introduced in the machine, whereupon the new balance is taken. As these tranactions have already been recorded in the respective totalizers in the first booking operation, they must not be entered again in these supplemental booking operations. Therefore means are provided which cause, in a supplemental booking operation, merely an actuation of the balance mechanism, but not of the totalizers, although totalizer keys have been depressed in order to print the respective characters. According to the invention this is obtained by the action of a special kind-of operation disc which action is tripped by setting the kind-of operation lever to the position "Duplicate".

In order that the invention may be more readily understood, an embodiment of the same is illustrated by way of example in the drawings which accompany and form part of this specification.

In these drawings

Figure 3:
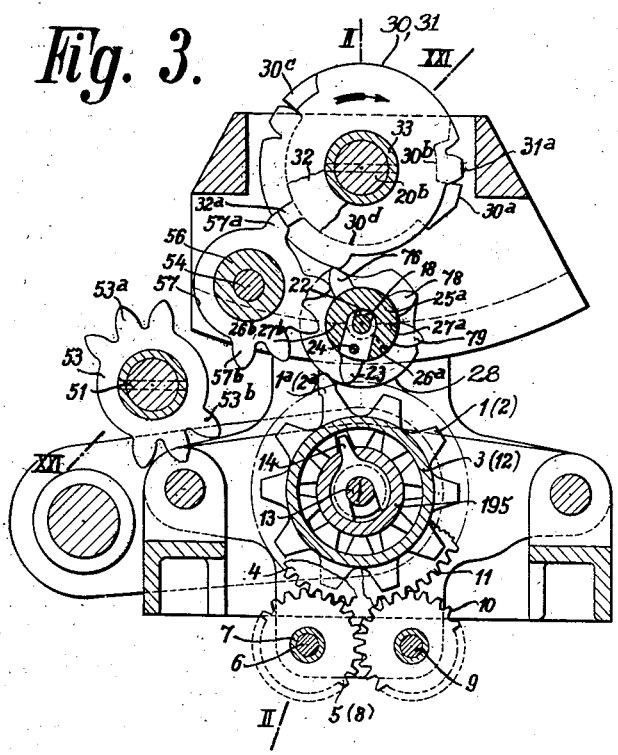
Figure 4:
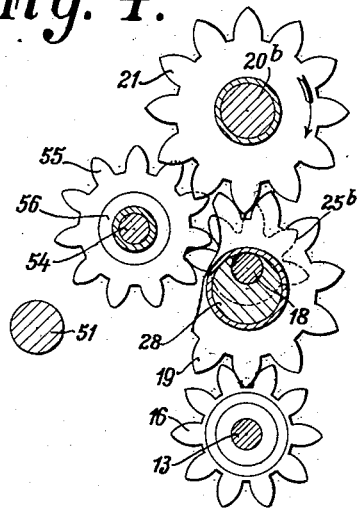
Figure 5:
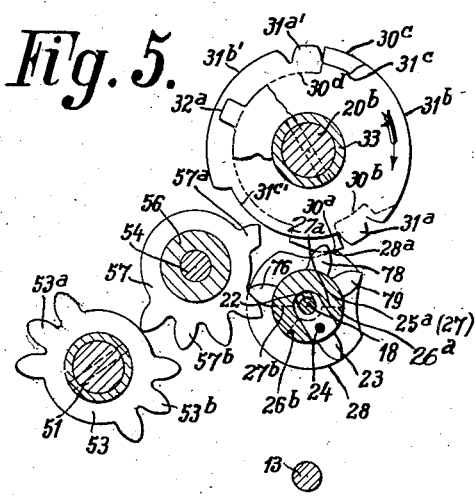
Figure 6:
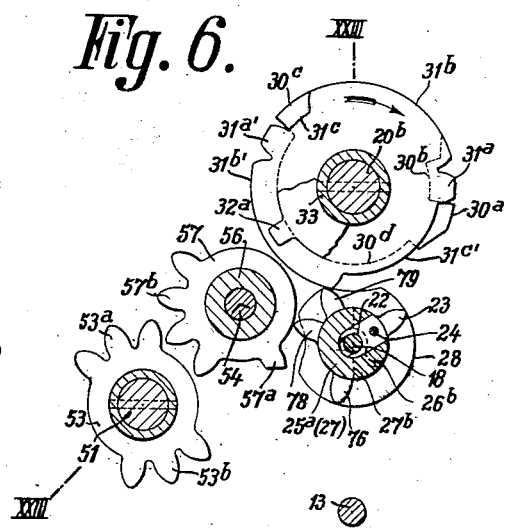
Figure 7:
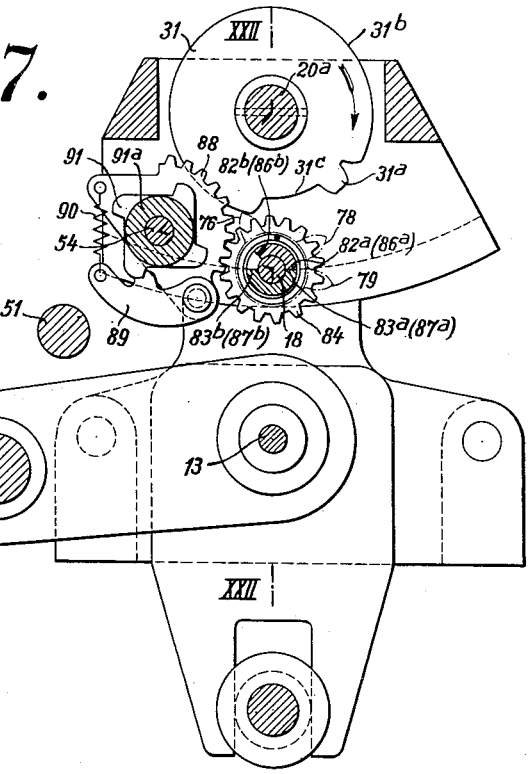
Figure 8:
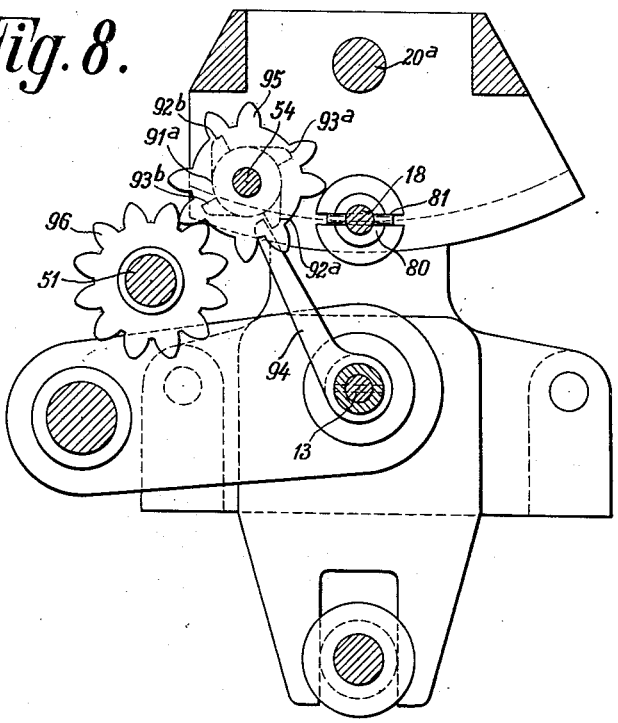
Figure 22:
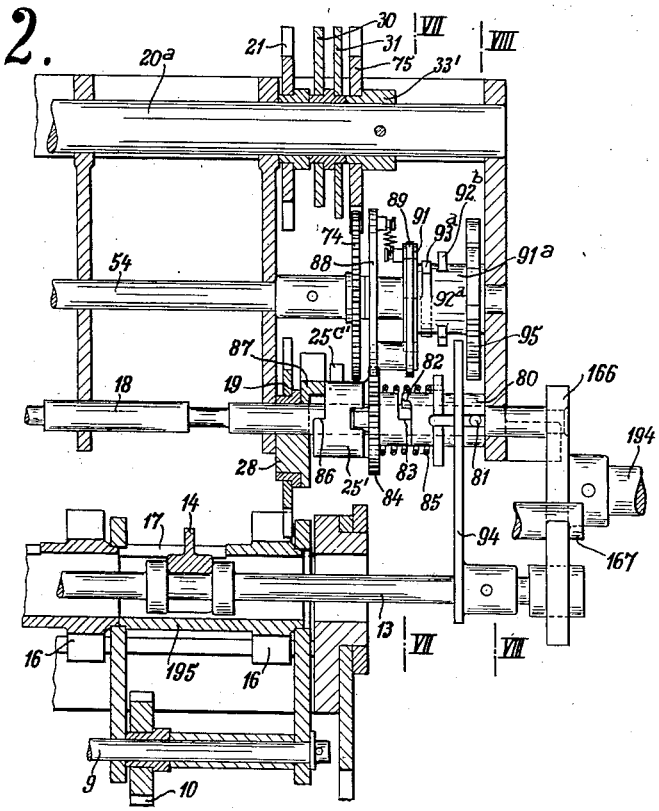
Figure 23:
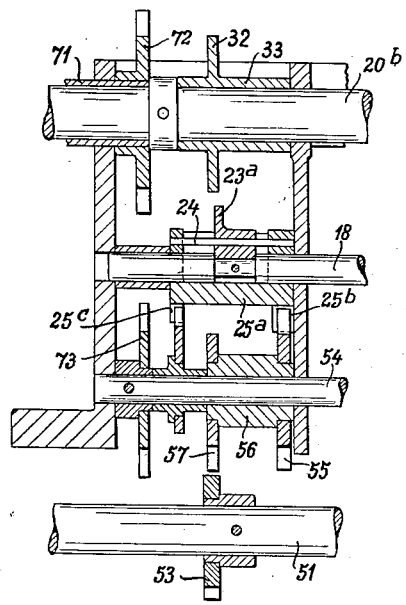
Figure 24:
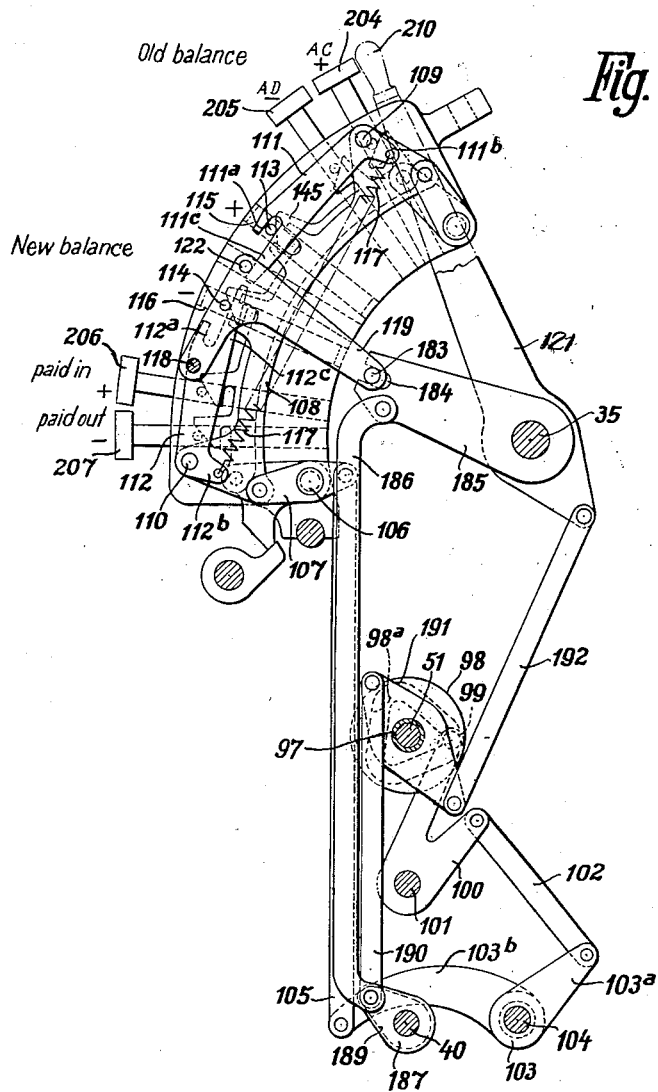
Figure 25:
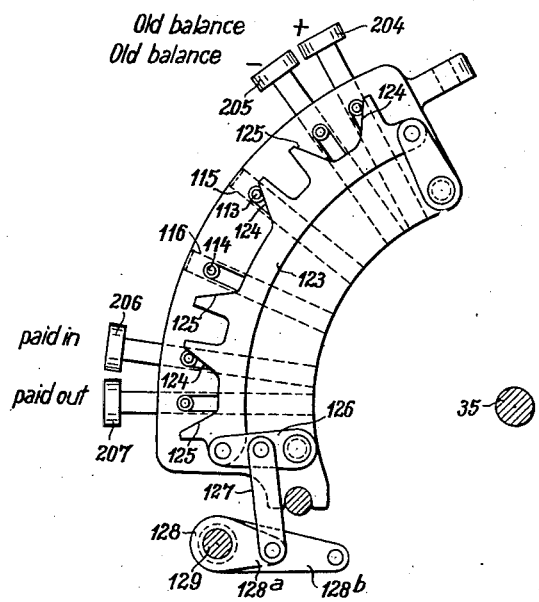
Figure 26:
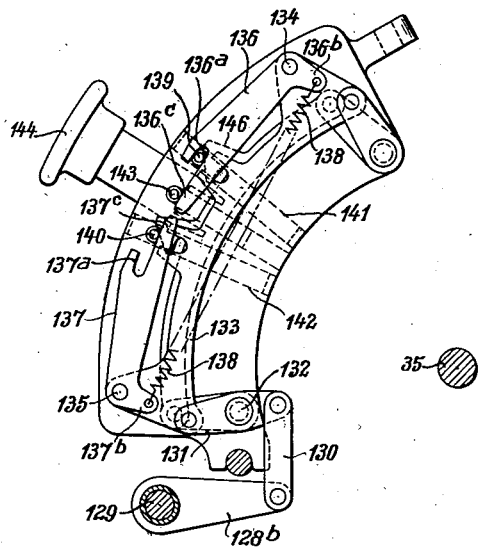
Figure 27:
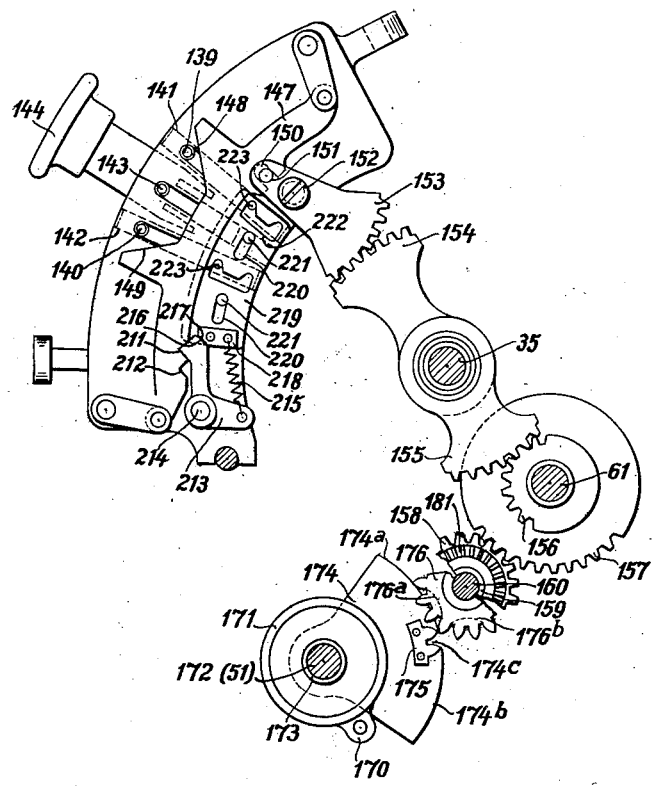
Figure 28:
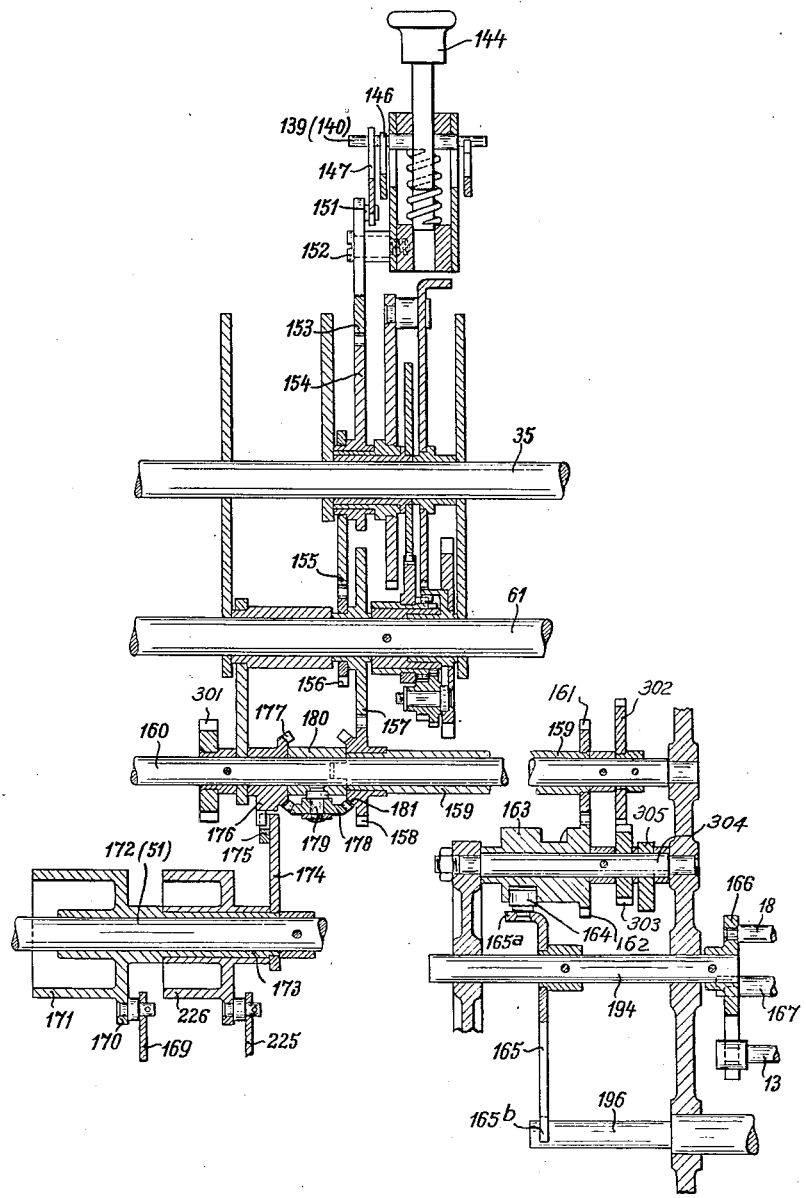
Figure 29:
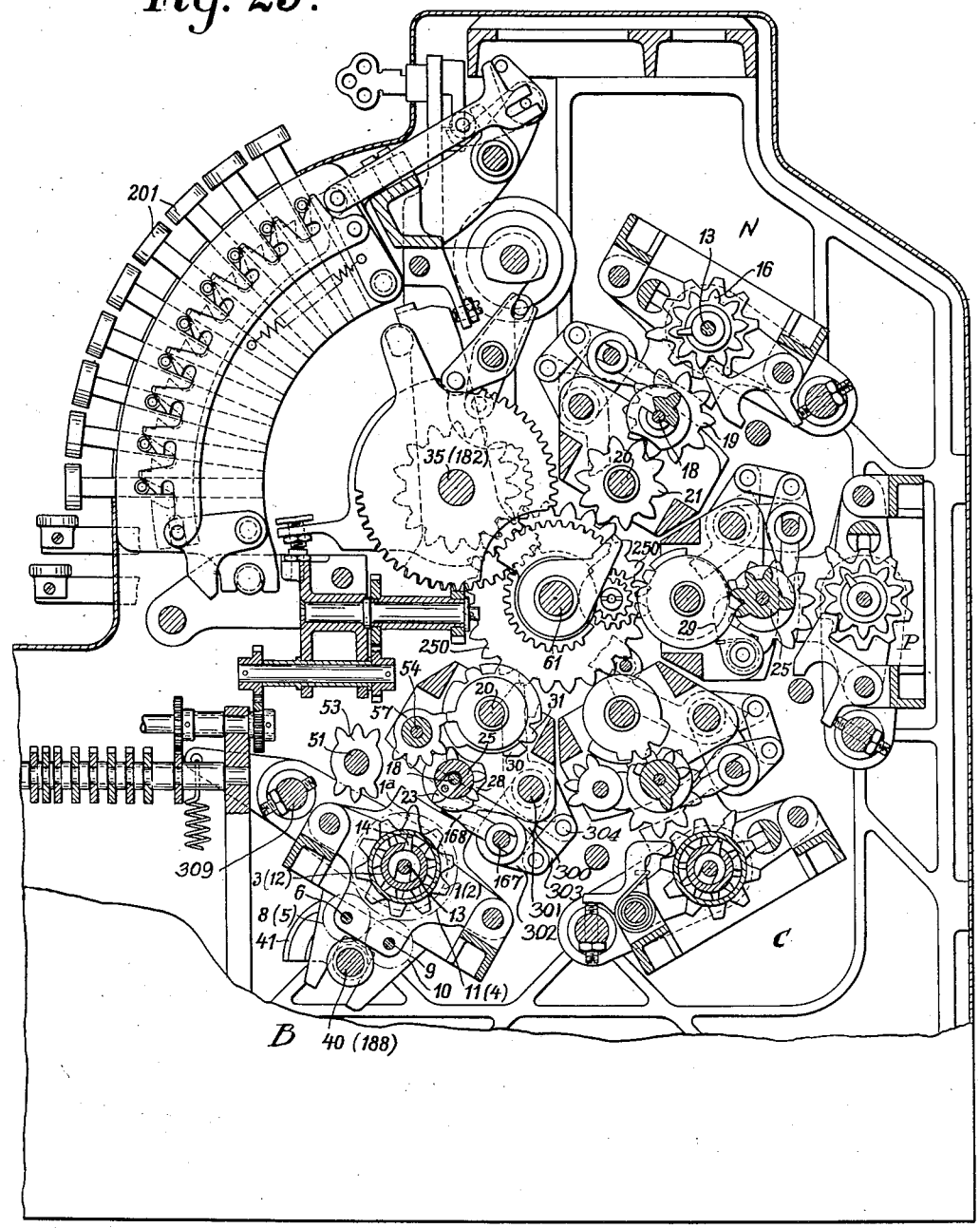

Figure 1 is a diagrammatic view of the keyboard of the machine,

Figure 2 is a longitudinal section through the balance mechanism on line II—II of Figure 3, Figure 2a is the right-hand continuation of Figure 2, Figure 3 is a cross section through the balance mechanism on line III—III of Figure 2, Figure 4 is a cross section through the balance mechanism on line IV—IV of Figure 2, Figure 5 is a cross section through the balance mechanism showing the position of the parts after preparation of the tens transfer, Figure 6 is a similar cross section showing the position of the parts after completion of the tens transfer, Figure 6a is a perspective view of a detail of the tens-transfer mechanism, Figure 7 is a cross section through the balance mechanism on line VII—VII of Figure 22, Figure 8 is a similar section on line VIII—VIII of Figure 22, Figure 9 is an elevation of the drive for the transfer mechanism returning shaft, Figure 10 is an elevation of the driving means for the step shaft, Figure 10a shows a detail of Figure 10 on an enlarged scale, Figures 11 and 12 are further details of Figure 10, Figure 11a is a perspective view of the pinion shown in Fig. 11, Figure 13 is a cross section through the drive of the step shaft and return shaft, Figure 14 is a cross section on line XIV—XIV of Figure 9, Figures 15 to 20 show details of Figure 13, Figure 21 is a longitudinal section through the balance mechanism on line XXI—XXI of Figure 3, Figure 21a is the right-hand continuation of Figure 21, Figure 22 is a longitudinal section through the right-hand end of the balance mechanism on line XXII—XXII of Figure 7, Figure 23 is a similar section through the left-hand end thereof on line XXIII—XXIII of Figure 6, Figure 24 is a cross section taken to the right of the bank of the main totalizer controlling keys together with the balance lever and controlling slide, Figure 25 is a cross section taken to the right of the bank of the main totalizer controlling keys showing the actuating slide in moved position, but omitting the balance lever, Figure 26 is a cross section taken to the right of the motor key bank, together with the controlling slide, Figure 27 is a cross section taken to the right of the motor key bank, together with the coupling slide, Figure 28 is a section through the motor key bank and the device for shifting the rider axle, looking from the rear of the machine, Figure 28a is a developed view of the setting drum shown in Fig. 28, Figure 29 is a cross section through the entire amount setting mechanism of the machine, Figure 30 is a section through the "kind-of-operation" and "balance" lever controlling mechanisms, Figure 31 is a sectional elevation of Figure 30 showing the "kind-of-operation" lever controlling mechanism for the balance mechanism, Figure 32 is a similar elevation showing the "kind-of-operation" lever controlling mechanism for the individual totalizers.

Figure 33:
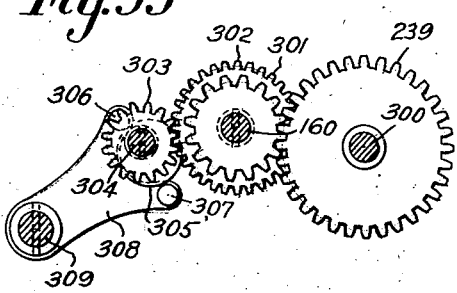

Figure 33 is a detail view of a part of the balance mechanism engaging means.

The keyboard, Figure 1, comprises eight rows or banks of amount keys 201 and two rows or banks of totalizer selecting keys 202, 203. The keys 202 serve to select the credit totalizers for the introduction of paid-in-entries, while the keys 203 serve to select the debit totalizers for the introduction of paid-out-entries. A further row or bank of keys comprises a key 204 for positive old balances, a key 205 for negative old balances, and two keys 206, 207 for paid in- and paid out-entries. The keyboard further comprises a motor key 144, a balance lever 121 serving to condition certain mechanism of the machine to take the new balance, and a kind-of-operation lever 38. The latter can be set to four positions, viz. addition, sub-total or interim total, grand total, and duplicate. The machine is provided with a row of nine totalizers P (Fig. 29) for the positive entries and another row of nine totalizers N (Fig. 29) for the negative entries. Furthermore, a third row C (Fig. 29) comprising six control totalizers is provided which serve, respectively, to accumulate the positive and negative old balances, the paid in- and paid out-entries, and the positive and negative new balances. Each of the three groups of totalizers have allotted to them a hand lever denoted by 208, 209, 210, respectively, which select the totalizer from which a total is to be taken. A fourth row B (Fig. 29) is formed by the balance mechanism which is thrown into co-operation in recording the old balances, the positive and negative new entries, and in taking the new balance, but remains out of operation in taking the total from one of the other totalizers.

The balance totalizer mechanism, Figures 2 and 3, is designed in known manner as an adding and subtracting mechanism. It comprises in each decimal order two totalizer wheels, one of which, 1, serves as the adding wheel while the other, 2, is the subtracting wheel. The hub 3 of each adding wheel 1 has fast on it a pinion 4 which is in mesh with another pinion 5 fast on a hub 7 mounted on a shaft 6. The hub 7 has further fast on it a pinion 8 in mesh with a broad pinion 10 loosely mounted on a shaft 9 (Fig. 22). Pinion 10 is further in mesh with a pinion 11 fast on the hub 12 of the subtracting wheel 2. Upon one of the two wheels being driven, a rotation to a like extent but in an opposite direction is imparted to the other wheel.

The wheels 1, 2 are further provided with internal teeth which may be engaged by the riders 14 mounted on the shiftable rider axle 13. The riders 14 are mounted on constrictions of axle 13 so as to take part in the axial shifting motion of the latter but freely turn thereon.

The axle 13 can be shifted into three positions in which the riders 14 are in mesh either with the internal teeth of the adding wheels, with those of the subtracting wheels 2, or with none of them.

The wheels 1, 2 of each order are mounted on the extended hub 195 of a differential wheel 16 which hub has a longitudinal slot 17 in which rider 14 may be shifted. That wheel with the internal teeth of which the rider 14 is in mesh is thus coupled with the differential wheel 16. The latter is driven in accordance with the depression of the respective amount key of the order under consideration, the wheel 250, Figure 29, of which has been positioned correspondingly in the first period of the machine operation. Previous to the return of the set wheels 250 the balance mechanism is coupled with them by rocking it to such an extent that the differential wheels 16 come into mesh with the tens transfer wheels 19 which are eccentrically mounted on a shaft 18. The tens transfer wheels 19 are permanently in mesh, by intermediate wheels 21 loose on shaft 20, with the wheels 250.

Now, when in an adding operation of the machine the wheels 250 have been positioned in accordance with the depressed amount keys 201, and the differential wheels 16 have been coupled with the respective totalizer wheels, for instance with the adding wheels 1, by the axle 13 being shifted in accordance with the depression of one of the special keys 204, 205, then the coupling of the balance mechanism takes place, in a manner shown herein, and also shown and described in the United States patent No. 2,039,143, issued to Ernst Breitling on April 28, 1936, by rocking it into co-operative position, so that the differential wheels 16 come into mesh with the tens transfer wheels 19, Figures 4 and 29. In the subsequent return of the wheels 250 the differential wheels 16 are turned clockwise, Figure 3, according to the position of the wheels 250. This rotation is transmitted in clockwise direction to the balance totalizer wheels coupled with the differential wheels 16, in the present case to the adding wheels 1. The other wheels, viz. the subtracting wheels 2, are turned to the same extent as the adding wheels 1 but in opposite direction, that is, counterclockwise.

With subtractive amount introduction the axle 13 is shifted to the left to such an extent, Figure 2, that the riders 14 couple the subtracting wheels 2 with the differential wheels 16. The subtracting operation is the same as described for adding operations, with the only difference being that the subtracting wheels 2 are turned clockwise and the adding wheels 1 counter-clockwise.

The tens transfer mechanism is similar to that described in the specification of my co-pending application Serial No. 424,372, filed January 29th, 1930, which is adapted to the present balance mechanism. The German application corresponding to this U. S. application has matured into Patent No. 535,537, October 12, 1931.

Together with the rider axle 13 is shifted the shaft 18, Figures 2 and 3, on constrictions 22 of which are rotatably but not shiftably mounted the companion tens teeth 23 in such a manner as to be opposite always to the corresponding rider 14 and to the coupled counting wheels 1 or 2. When a passage from 9 to 0 takes place in any order, the tens tooth 1a or 2a of the wheel 1 or 2 strikes the companion tens tooth 23 and rocks it counterclockwise on shaft 18 by 45 degrees. The tens coupling member 25 is free to turn on shaft 18 but is not shifted therewith, and its hub 25a has a recess in which a companion tens tooth 23 on shaft 18, may be shifted. Each tens tooth 23 is bifurcated at its inner end to straddle shaft 18 and is connected by a short rod 24 to its tens coupling member 25 in such a manner that it is held in position, and upon shaft 18 being shifted it can slide in the recess of hub 25a, but a rotation about shaft 18 is executed by both these members in common and to the same extent.

Each tens coupling member 25 is provided on its left-hand side with an extension 26 which co-operates with an extension 27 of an eccentric 28 loosely mounted on shaft 18 (Fig. 6a). The two stop faces 26a and 27a (Fig. 3) of these two extensions include an angle of 45 degrees which is equal to a preliminary movement of the member 25 independent of the eccentric 28, while the two other stop faces 26b and 27b in the position of rest abut on one another (Fig. 3). Upon a rotation of 45 degrees of the companion tens tooth 23 in counterclockwise direction, Figure 5, the tens coupling member 25 is turned by this amount until face 26a of the extension 26 abuts on face 27a of the extension 27.

The tens coupling member 25 is yieldingly held locked in every position by a pawl 29, Figure 29. The locking disc 30 is fast on a hub 33 pinned to shaft 20a or 20b. The hub 33 has further fast on it a step disc 31 and a further locking disc 32.

The shafts 20a and 20b with the step discs and locking discs thereon receive, by a drive to be described hereinafter, a rotation in several steps during which the tooth 31a of the step disc 31 by striking tooth 78 (Fig. 5) imparts a further counterclockwise rotation of 90 degrees to the tens coupling member 25 that has already been turned 45 degrees by the preparatory operation, Figure 6. When this takes place, the eccentric 28 is also turned 90 degrees owing to the surfaces 26a and 27a abutting on one another (Fig. 6).

On the eccentric 28 is mounted the tens transfer pinion 19, Figures 2 and 4, which is in mesh both with the amount intermediate wheel 21 and with the differential actuating wheel 16 of the next higher order. Upon the rotation of eccentric 28 by 90 degrees, the tens transfer pinion 19 rolls on the intermediate wheel 21, which is at rest, and advances the differential actuating wheel 16 of the next higher order by one unit.

The members required for the differential introduction of the amounts and for the tens transfer are present in each decimal order. This also is true for the appurtenant step discs 31, Figure 2. As the tens transfers, beginning from the lowermost order, must follow each other continuously through all orders, the transfer places, that is the teeth 31a of the step discs 31, are arranged in a helical line on the step shafts 20a and 20b, Figures 2 and 3. As with a high number of orders the angular distances between the transfer teeth would become too small on step discs of normal size, the step shaft is divided into two parts 20a and 20b. In the present embodiment the right-hand part 20a of the step shaft is allotted to the six lower orders of the balance mechanism, while part 20b comprises the three highest orders thereof. This arrangement provides one more order in the balancing mechanism than there are rows of amount keys 201 and differential wheels 250.

For reasons to be explained hereinafter the balance mechanism requires a double actuation of the two-part step shafts, to which end the drive described hereinafter is provided. Furthermore, the members 25, 23, 28 which have been displaced in a tens transfer operation have to be moved back to initial position. This return motion is derived likewise from this drive.

35 denotes the driving shaft, Figures 9 and 13, on which is fast a gear wheel 36 to which during the machine operation one full continuous revolution is imparted. Wheel 36 has opposite to it a double-wheeled coupling pinion 37 (Fig. 14) which upon introduction of an amount is brought by the kind-of-operation lever 38 into mesh with wheel 36 and with a wheel 39 of the same size loosely mounted on shaft 35. By setting the kind-of-operation lever 38 to "addition" the shaft 40, Figure 9, and the cam groove segment 41 fast thereon are set in such a manner that the anti-friction roller 42 of pitman 43 comes to lie in the lowermost place of the cam groove 41a, whereby pitman 43 is pulled downward. As will be seen from Figure 9, pitman 43 is connected to one arm of a lever 45 loose on shaft 44 the other arm of which carries the coupling pinion 37. Therefore, the pitman 43 moving downward, the pinion 37 comes into mesh with the gear wheels 36 and 39. When the kind-of-operation lever 38 is set to one of the total taking positions, pitman 43 is moved upwards, whereby pinion 37 is disengaged from the gear wheels 36, 39, so that no actuation of the tens transfer mechanism takes place as explained hereinafter. Immediately after pinion 37 has been disengaged, a locking nose 45a of the right-hand arm of lever 45 engages and locks the wheel 39, while a locking pawl 46 mounted on the other arm under spring action holds the disengaged pinion 37 secured against rotation.

The loose gear wheel 39 is rigidly connected to a gear wheel 47, Figures 9 and 13, which is in mesh with a gear wheel 48 loose on journal 44. When, as during addition, the wheels 36, 39 are coupled with one another by pinion 37, the wheel 48 makes one full revolution during a machine operation. Wheel 48 has rigidly connected to it an actuating wheel 49 and a locking disc 50, Figures 9, 13, and 14. Wheel 49 possesses a series of teeth 49a, a gap 49b and a locking face 49c. The locking disc 50 has a surface 50a. Wheel 49 and locking disc 50 co-operate with a gear wheel 52 fast on the return shaft 51. In the plane of locking disc 50 wheel 52 has two lateral gaps 52a and 52b and in the plane of wheel 49 two lateral gaps 52c and 52d, which gaps are each formed by two successive teeth being cut away by half their width. In the position of rest the locking face 50a of disc 50 engages the the gap 52a and thus locks wheel 52 against rotation. Upon wheel 49 rotating counterclockwise, face 50a releases wheel 52 as soon as the first tooth 49d of the teeth 49a strikes the half tooth 52f. Wheel 52 is thereupon turned by the teeth 49a until the locking face 49c enters gap 52c and locks wheel 52 after a revolution of about 120 degrees. Toward the end of the operation of the machine the face 50b strikes tooth 52g and imparts to wheel 52a further rotation of about 60 degrees until wheel 52 and the return shaft 51 are again locked by the locking surface 50a entering gap 52b.

The return shaft 51, Figure 21, extends across the entire length of the balance mechanism and has mounted on it the mutilated return pinions 53 belonging to the individual decimal orders. By means of the two groups of teeth 53a, 53b, Figure 3, on pinions 53, the parts displaced in a tens transfer operation are returned to initial position at the beginning of the next machine operation. Each tens coupling member 25 has on its right-hand end a group of five teeth 25b, Figures 4 and 6a, in mesh with a wheel 55 mounted on shaft 54 and rotated clockwise by about 120 degrees upon rotation of member 25. The return pinion 55 is fast on a hub 56, Figure 21, loose on shaft 54 on which hub is fixed a return wheel 57, Figure 3. The teeth 57b of the latter are adapted to co-operate with the groups of teeth 53a and 53b of return pinion 53. During the tens transfer operation the return wheel 57, Figures 5 and 6, is also rotated clockwise by about 120 degrees. It can execute this rotation unhindered as no teeth of pinion 53 are opposite the teeth 57b. The clockwise rotation of the return shaft 51, Figure 6, starts at the beginning of the next machine operation and it is now that one of the groups of teeth 53a or 53b of return pinion 53 engages the teeth 57b of wheel 57 and returns wheel 55 and therewith the tens coupling member 25 back to its initial position, whereby the companion tens tooth 23 is also returned to operative position and is thus ready for the preparation of a new tens transfer.

The two-part step shaft 20a, 20b is driven from the driving shaft 35 through wheel 36 rigid thereon, coupling pinion 37 and wheel 39 loose on shaft 35, Figures 9 and 13. Beside wheel 39 is fixed a set of three actuating and locking discs 58, 59, 60 which make a continuous full revolution during the machine operation, and co-operate with a pinion 62 (Fig. 11a) mounted on shaft 61 in such a manner that pinion 62 is alternatively turned and locked by the discs 58, 59, 60, Figures 10, 11, 13. In the position of rest the locking face 58a of disc 58 engages a gap 62a of pinion 62, Figure 11, and thus locks the latter. Shortly after the set of discs 58, 59, 60 has begun rotating, the face 59a of disc 59 strikes tooth 62b and turns pinion 62 by 30 degrees so that the locking face 59b engages gap 62c and pinion 62 is locked again. Thereupon the face 60a of disc 60 engages the tooth 62d and turns pinion 62 farther by 30° until the locking face 60b engages the gap 62f whereby pinion 62 is locked anew. Upon further rotation of the set of discs the face 59c of disc 59 strikes the tooth 62g and thereby turns pinion 62 so far that it engages the teeth 58b. Hereby a last rotation of pinion 62 by 300 degrees is caused until it is locked in its initial position by the locking face 58a entering gap 62a.

During a machine operation the pinion 62 thus has made a full counterclockwise rotation, but in three sections, viz. of 30 degrees, 30 degrees and 300 degrees. The pinion 62 has fixed to it a set of six actuating and locking discs 63, 64, 65, 66, 67, 68, of which the discs 63, 64, 65 co-operate with a pinion 69, while discs 66, 67, 68 co-operate with a pinion 70, Figures 10, 12, 13.

In the position of rest the locking face 65a, Figures 10 and 15 to 17, of the locking disc 65 engages the gap 69a of pinion 69 and locks it against being turned. At the commencement of the rotation of pinion 62 and set of discs 63 to 68 rigid therewith, the face 63a of disc 63 strikes the tooth 69b and turns pinion 69 by 30 degrees clockwise, so that the locking face 63b engages gap 69c whereby pinion 69 is locked. Thereupon the face 64a of disc 64 strikes tooth 69d and turns piston 69 by 30 degrees more until the locking face 64b engages gap 69f whereby pinion 69 is locked again. In the further course of the rotation of the set of discs the tooth 63c strikes tooth 69g and brings the two teeth 65b and 65c into mesh with the gaps 69h and 69i. Tooth 63b thereupon turns pinion 69 so far that the locking face 65 can engage gap 69p. Pinion 69 is thus locked again after this partial rotation of 150 degrees, until tooth 63f strikes tooth 69k. In this last section of motion the teeth 65f and 65g come to engage the teeth 69m, 69n, 69o of pinion 69 and tooth 63g turns pinion 69 so far that after this further partial rotation by 150 degrees it is locked again by locking face 65a again engaging gap 69a. In this way pinion 69 has made a full revolution in clockwise direction, but in four sections, viz. of 30, 30, 150, and 150 degrees.

In a similar manner co-operate the other actuating and locking discs 66, 67, 68 with the pinion 70, Figures 12 and 18 to 20. The two faces 66a and 67a of the discs 66 and 67 impart to pinion 70 two successive partial motions of 30 degrees each, the teeth 68a in connection with the teeth 66c and 66e impart to it a full revolution of 360 degrees, and the teeth 68b impart to it a partial rotation of 300 degrees; after which pinion 70 is returned to initial position and is again locked by locking face 68c engaging gap 70a. Pinion 70 thus executes during an entry operation, two full revolutions, but in four sections, of 30, 30, 360 and 300 degrees.

As already mentioned the step shaft consists of two parts 20a and 20b. On the left-hand end of part 20b, Figure 21, is fixed pinion 69 which transmits its revolution of 360° composed of four sections, directly to shaft part 20b. The double revolution of pinion 70 of four sections is transmitted to part 20a. For this purpose pinion 70 is loosely mounted by means of a long hub 71 on part 20b, Figure 21. Hub 71 has rigid on its other end a wheel 72 in mesh with a wheel 73 fixed on shaft 54. Shaft 54 has rigid on it near its right-hand end a wheel 74 in mesh with a wheel 75 fast to shaft part 20a through hub 33' and thus transmitting the stepwise double rotation of pinion 70 to part 20a.

On the right-hand part 20a of the step shaft, Figures 2 and 2a, are fixed six groups of step and locking discs allotted to the six lowermost decimal orders. Like the groups illustrated in Figure 2 for the part 20b of the step shaft, these groups are composed each of a hub 33 fixed on part 20a and carrying a return locking disc 32, a step disc 31 and an eccentric locking disc 30. Each step disc 31, Figure 7, is provided with a tooth 31a, a circumferential locking face 31b, and a gap 31c. Each eccentric locking disc 30, Figures 5 and 6, is provided with a locking face 30a, a gap 30b, a circumferential locking face 30c, and a recess 30d. The return locking discs 32 possess only a short locking face 32a, Figures 3, 5. On the left-hand part 20b of the step shaft, Figure 2, are fixed three groups of step and locking discs which are allotted to the three highest decimal orders. These discs are designed like those of the lower orders except that the step discs 31 have on their periphery two actuating places that is two teeth 31a and 31a', two locking faces 31b and 31b' and two gaps 31c and 31c', Figures 3, 5, 6.

In the position of rest, Figure 3, the step disc 31 locks the tens coupling member 25 against clockwise rotation, by the locking face 31b abutting on tooth 76 of member 25. This tooth 76 is the first of a group 25c formed by three teeth 76, 78, 79, Figures 2 and 6. Member 25 is further secured against counterclockwise rotation by its teeth 25b, Figure 4, being in mesh with the return pinion 55 while the wheel 57, Figure 3, by the tooth 57a, abuts on the locking face 32a of the return locking disc 32. When the first partial rotation is imparted to the step shaft, the tens coupling member 25 and return pinion 55 are released by the locking faces 31b and 32a moving out of the path of pinion 25 and pinion 55, respectively. Thereupon takes place the return motion of about 150 degrees effected by the return shaft 51, but this motion has no effect if no tens transfer has taken place previously, that is if no teeth of wheel 57 are opposite the return discs 53, Figure 3.

In the second partial rotation of the step shaft part by 30 degrees the locking face 30a of the eccentric locking disc 30 comes to abut on the face 28a of the eccentric 28, Figure 5, and locks it during the introduction of the amount.

Now when a passage from 9 to 0 takes place in the amount introduction in one or more orders, the tens coupling member 25 is turned 45 degrees in counterclockwise direction, as described, Figure 5. Upon the step shaft 20 making its further rotation of 360 or 150 degrees, tooth 31a advances member 25 that has already been turned 45 degrees, by 90 degrees, Figure 6. Those tens coupling members which have not been displaced in the preparatory operation are not turned by the step discs 31, as the latter when rotating can freely pass through the gap existing between the teeth 76 and 78 of pinion 25, Figure 3. The return pinion 55, which is in mesh with member 25 is entrained correspondingly together with wheel 57, Figures 3, 4, 5, 6 upon rotation of member 25, so that the teeth 57b are brought into the path of the teeth of return pinion 53, Figure 6. After the tens coupling member 25 has been turned 90 degrees by tooth 31a, Figure 6, face 31b locks member 25 until the latter is released again by recess 31c but even then the member 25 is yieldingly held locked by the pawl 29, Figure 29. If no change of sign of the balance takes place in the balance mechanism, the teeth 31a and 31a', respectively, of the step discs pass in the last partial rotation of the step shaft parts past member 25 without affecting it. At the end of the machine operation the locking faces 31b of the step discs lock against clockwise rotation both the tens coupling members 25 which have been displaced by 135 degrees and the non-displaced ones. In the first case tooth 79 abuts against the locking face 31b', in the latter case, tooth 76.

The return of the displaced tens coupling members takes place at the commencement of the next machine operation. After the first partial rotation of the step shaft parts 20a and 20b by 30 degrees, whereby the locked state of the members 25 has been eliminated, the clockwise rotation of the return shaft 51, Figures 6 and 23, comes into effect in so far as the return pinions 53 fast thereon engage by one of their groups of teeth 53a or 53b the teeth 57b of the displaced return wheels 57 and turn the latter together with the return pinions 55 counterclockwise to such an extent that the tens coupling members 25 in mesh with the latter and the eccentrics 28 are removed to initial position, Figure 3, whereupon the members are ready for a new tens transfer.

When the totalizer constituting the balance mechanism contains a positive amount and the capacity of the balance mechanism is exceeded by the entry of an additional amount, a passage from 9 to 0 takes place in the highest decimal order. This passage can only be effected by a tens transfer, as no row of amount keys and no amount differential wheels 250 are allotted to the highest order of the balance mechanism. The tens tooth 1a of the adding wheel of the highest order, Figures 2, 3, 23, strikes in this transfer the companion tens tooth 23a of the highest order and rocks it by 45 degrees. The companion tens tooth 23a is rigidly fixed on shaft 18, so that the latter takes part in this rocking motion. On the right-hand end of shaft 18, Figures 2a, 8 and 22, is mounted a sleeve 80 having a longitudinal slot engaged by a pin 81 rigid on shaft 18, so that sleeve 80 does not partake of the shifting motion of shaft 18 but of a rotation thereof. The sleeve 80 has on its left-hand end face a shoulder 82, Figures 2a, 7, 22, co-operable with a shoulder 83 of the tens coupling member 25' loose on shaft 18. Member 25' is arranged in front of the lowermost order and carries a pinion 84 rigid with it. Between sleeve 80 and pinion 84 is disposed a torsional spring 85 which holds the stop faces 82a and 83a of the shoulders 82, 83 in abutment on one another, while the other stop faces 82b, 83b include an angle of 45 degrees which corresponds to the path of the tens transfer preparation.

The tens coupling member 25' has also a shoulder 86 on its left-hand side which shoulder co-operates with the shoulder 87 of the appurtenant eccentric 28. In the position of rest the stop faces 86a, 87a of the two shoulders 86, 87 abut on one another, while the other stop faces 86b, 87b include an angle of 45 degrees, Figure 7. The above-described tens transfer elements are disposed in front of the lowermost order and have allotted to them likewise the corresponding step and locking discs 31 and 30.

Pinion 84 is in mesh with a toothed segment 88, Figures 7 and 22, loose on shaft 54 and having pivoted on it a pawl 89 which, by a spring 90, is held in mesh with a four-teeth ratchet wheel 91. The latter is likewise loose on shaft 54 and its body 91a carries four cams 92a, 92b, 93a, 93b, Figure 8. These cams are disposed in two planes in such a manner that the diametrically opposite cams 92a, 92b of the one plane are displaced by 90 degrees relatively to the cams 93a, 93b of the other plane. With these cams co-operates a locking arm 94 which is rigidly fixed on the non-rotatable rider axle 13 so as to be shifted with the latter. Hence, when the rider axle 13 is shifted into position of addition, arm 94 comes into the path of cams 92a, 92b and when shifted into position of subtraction, into the path of the cams 93a, 93b.

Now if the balance mechanism contains a positive total and a positive amount is added thereto, one of the cams 92a, 92b is opposite locking arm 94. In the event that by the addition of this amount the capacity of the balance mechanism is exceeded in a positive sense, a tens transfer is prepared, as already described, in the highest decimal order by a passage of the adding wheel from 9 to 0, whereby sleeve 80 receives a rotation of 45 degrees. Now, since the locking arm 94 is opposite one of the cams 92a, 92b, the ratchet wheel 91 is locked and therewith also segment 88 and pinion 84. In the rotation of sleeve 80 by 45 degrees thus the action of the torsional spring 85 must be overcome until the stop face 82b of sleeve 80 comes to abut on stop face 83b of tens coupling member 25', Figure 7. As soon as the tens tooth 1a of the adding wheel of the highest order releases again its companion tooth 23a, spring 85 restores shaft 18 with sleeve 80 and tooth 23a to initial position. In the subsequent last partial rotation of 300 degrees of the step shaft part 20a the step disc 31 passes without effect past the tens coupling member 25' of the lowermost order, as this pinion has not been displaced and therefore none of the teeth 25b' of member 25' is in the path of the step disc 31.

If the balance mechanism contains a negative total and the capacity of the balancing mechanism is exceeded downward by subtraction of an amount, a tens transfer preparation takes place also in the highest order by a passage of the subtracting wheel from 9 to 0 which preparation or setting movement is transmitted as a 45 degrees rotation through shaft 18 to sleeve 80. In this case the locking arm 94 is shifted to the left by the rider axle 13 being shifted to position of subtraction, and is opposite one of the cams 93a, 93b, whereby ratchet wheel 91 and thus also the tens coupling member 25' is locked. The rotation of sleeve 80 is thus not transmitted to the tens coupling member 25' which is held locked, but has no effect, the tension of spring 85 being overcome. The last partial rotation of the shaft part 20a does not cause, in this case either, a transmission of a supplementary unit.

If the balance mechanism contains a positive total and a passage from the positive to a negative value takes place by subtraction of an amount, the subtracting wheel of the highest order, which now acts as an adding wheel, experiences a passage from 9 to 0. This causes a rotation of 45 degrees of the companion tens tooth 23a of the highest order, of shaft 18 and sleeve 80. By being set for subtraction the rider axle 13 and therewith the locking arm 94 is shifted to the left so that the latter arrives in the plane of the cams 93a, 93b which now are not situated in parallel with but displaced by 90 degrees relatively to locking arm 94. The appurtenant tens coupling member 25' is thus not locked and is rotated when sleeve 80 rotates 45 degrees, as the torsional spring 85 holds in contact the stop faces 82a and 83a of sleeve 80 and of member 25', while the angular gap of 45 degrees existing between the stop faces 86b and 87b of the shoulders 86 and 87 of member 25' and eccentric 28, is closed. After this preparation begins the last partial rotation of shaft part 20a, in which rotation the step disc 31 located in front of the units order imparts to the member 25', which has already been displaced by 45 degrees, a further rotation of 90 degrees, whereby also the appurtenant eccentric 28 is turned by 90 degrees. When this takes place, the transfer wheel 19 mounted on the eccentric 28 rolls on the intermediate wheel 21 which is at rest, Figure 4, and advances the actuating wheel 16 of the units order by one unit. If in this tens transfer the subtracting wheel 2 coupled with this actuating wheel 16 makes a passage from 9 to 0, a tens transfer is thereby prepared in the next higher order and executed by the respective step disc 31 during the last partial motion of the step shaft parts 20a. In this way this tens transfer is continued according to requirement.

The same procedure takes place if the balance mechanism contains a negative total which by addition of a positive amount becomes positive. In this case the addition of the positive amount causes the adding wheel of the highest order to experience a passage from 9 to 0. As explained above, this causes a rotation of 45° to the companion tens tooth 23a of the highest order of shaft 18 and sleeve 80. By setting the rider axle 13 for addition, the locking arm 94 is disposed in the plane of the cams 92a, 92b, which are now displaced 90° relatively to locking arm 94. The appurtenant tens coupling member 25' is thus not locked and is rotated when sleeve 80 rotates 45°, as the torsional spring 85 holds the stop faces 82a and 83a in contact, while the angular gap of 45° existing between the stop faces 86b and 87b of member 25' and eccentric 28, respectively, is closed. After this preparation begins the last partial rotation of shaft part 20a, in which rotation the step disc 31 located in front of the units order imparts to the member 25', which has already been displaced by 45°, a further rotation of 90°, whereby also the appurtenant eccentric 28 is turned by 90°. When this takes place, the transfer wheel 19 mounted on the eccentric 28 rolls on the intermediate wheel 21 which is at rest, Fig. 4, and advances the actuating wheel 16 of the units order by one unit. If in this tens transfer the adding wheel 1 coupled with this actuating wheel 16 makes a passage from 9 to 0, a tens transfer is thereby prepared also in the next higher order and executed by the respective step disc 31 during the last partial motion of the step shaft parts 20a. In this way this tens transfer is continued according to requirement.

It will be seen therefrom, that the supplementary transmission of a tens transfer from the highest order to the units order takes place only when a positive total becomes negative and inversely when a negative total becomes positive, that is only upon change of the sign, but not when the capacity of the balance mechanism is exceeded under the same sign.

The body 91a of ratchet wheel 91 has further rigid with it a mutilated pinion 95, Figure 8, which upon rotation of ratchet wheel 91 is likewise turned 90 degrees. Pinion 95 has a pitch of 12 teeth but every third tooth is cut away so that when it is turned by 90 degrees, which occurs in every change of sign of the balance total, always only two successive teeth of pinion 95 are in mesh with a companion pinion 96, the gear ratio being such as to cause the latter to turn 60 degrees. Pinion 96 is rigid with a hub 97 loose on shaft 51 and further carrying a grooved disc 98, Figure 24. The curved groove 98a of disc 98 is engaged by the roller 99 of an angle lever 100 loose on a shaft 101. The other arm of lever 100 is connected by a link 102 to the arm 103a of an angle lever 103 loose on a shaft 104. The other arm 103b of angle lever 103 has linked to it a rod 105 the upper end of which is connected to a two-armed lever 107 mounted on a journal 106 of the key board of the controlling totalizers. This two-armed lever 107 is connected to a controlling slide or carrier 108 swingingly mounted on the last-named key board. On the journals 109 and 110 of the carrier 108 are pivoted two coupling pawls 111 and 112. The free ends of these pawls have open slots 111a, 112a which are engaged by lateral pins of two key shanks 115, 116. A spring 117 disposed between the short arms 111b and 112b of the pawls holds the slotted arms 111c and 112c permanently engaged by the pins 113, 114 of these key shanks 115, 116. On a journal 118 is loose an angle lever 119 and a pin 183 on the latter engages a slot 184 of a lever 185. The latter is loose on shaft 35 and is connected to an arm 187 fixed on shaft 40 through the intermediary of a rod 186. The shaft 40 has rigid with it another arm 189 which by a rod 190 is in connection with a disc 191 loose on shaft 51 and by a link 192 connected to the balancing lever 121 loose on shaft 35. Angle lever 119 further carries a pin 122 which abuts on the extension 111c and 112c, respectively, of one of the pawls 111, 112.

If for instance a positive total occurs in the balance mechanism, one of the cams 92a, 92b arrives opposite arm 94 whereby the cam groove disc 98 is positioned by the members 91a, 95 to 97 in such a manner that roller 99 lies in one of the uppermost places of the groove 98a. This positioning through the members 100, 102, 103, 105, 107 results in the controlling slide 108 being shifted to lowermost position. Hereby also the two pawls 111, 112, which are linked to slide 108, are moved to lowermost position in which the slot 111a of the upper pawl 111 engages the pin 113 of the key shank 115, while pin 114 of key shank 116 is outside slot 112a of the lower pawl 112.

If the balance mechanism contains a negative total, one of the cams 93a, 93b is opposite locking arm 94, whereby the cam groove disc 98 is in such a position that roller 99 lies in one of the lowermost places of the groove 98a. By this positioning the controlling slide 108 has been raised to upper position in which slot 112a of the lower pawl 112 engages the pin 114 of key shank 116, whilst pin 113 of key shank 115 is released. With a positive total in the balance mechanism thus key shank 115 is coupled with pawl 111, and with a negative total key shank 116 is coupled with pawl 112.

Now when the balance lever 121 is set to position "Balance", Figure 1, in order to strike the new balance, the angle lever 119, Figure 24, is rocked clockwise through the intermediary of the members 192, 191, 190, 189, 40, 187, 186, 185. Thereby its pin 122 rocks that one of the pawls 111, 112 the extension 111c or 112c of which is in the path of pin 122. Now, as the slot 111a or 112a of the pawls is engaged by pin 113 or 114, the respective key shank 115 or 116 is depressed.

It results therefrom that in setting the balance lever 121 always one of the key shanks 115, 116 is depressed and that their selection is determined by the positive or negative content of the balance mechanism, the plus-key shank 115 being depressed in taking a positive total from the balance mechanism, while in taking a negative total the minus-key shank 116 is depressed.

The depressed key shank 115 or 116 is held locked by the hook-shaped lug of the locking slide 145, Figure 24, and determines at the beginning of the machine operation the selection of the respective controlling totalizer to which in striking the new balance the total contained in the balance mechanism is to be transmitted. According to whether the minus- or plus-key shank 115 or 116 has been depressed, the controlling totalizer for "positive new amounts" or that for "negative new amounts" is selected. The positioning of the type wheel for printing the corresponding sign is established likewise according to which key shank, 115 or 116, has been depressed, by means of suitable positioning members (not shown) by the gearing of the machine.

The two pins 113, 114 of the key shanks 115, 116 further co-operate with an actuating slide 123, Figure 25, swingingly mounted on the key board of the controlling totalizers. The three inclined faces 124 of slide 123 are allotted to the three positive keys 204, 206, 115 (old balance +, paid in, plus-key shank), while the three inclined faces 125 are allotted to the negative keys 205, 207, 116 (old balance —, paid out, minus-key shank). These inclined faces 124, 125 are oppositely directed in such a manner that slide 123 is held raised when a positive key is depressed, and lowered when a negative key is depressed. The lower swing arm 126 of slide 123 is connected by a link 127 to an arm 128a of a two-armed assembly 128 loose on shaft 129. The other arm 128b, Figure 26, is connected by a link 130 to a double lever 131 mounted on a journal 132 of the motor key board and having its other arm connected to a controlling slide or carrier 133 swingingly mounted on this board yieldingly held in the position shown in Fig. 26 by a spring, not shown. The upward or downward motion of slide 123 is thus transmitted by the described members to the controlling slide as a downward and upward motion.

Slide 133 carries two pins 134, 135, Figure 26, on which are pivoted two pawls 136, 137 designed like the pawls 111, 112. The extensions 136c, 137c of their slotted ends are held in contact with the pins 139 and 140 of two key shanks 141, 142 by a spring 138 extending between the two pawls. The key shanks 141, 142 are shiftably mounted in the motor key board and are held in upper position by springs. By the downward or upward motion of the controlling slide 133 with the pawls 136, 137 either pin 139 arrives in the slot 136a or pin 140 in slot 137a. Accordingly either the extension 136c or 137c of that pawl which engages one of the pins 139, 140 is shifted below the pin 143 of the motor key 144. Upon depression of the latter, pin 143 lowers the respective pawl 136 or 137 whereby also the key shank 141 or 142 coupled therewith is depressed. The depressed key shank 141 or 142 is held locked in depressed position by a hook-shaped lug of the locking slide 146, Figure 26, engaging from above the pin of the depressed key shank.

The pins 139, 140 of the two key shanks 141, 142 further co-operate with a coupling slide 147, Figures 27 and 28, which by means of two links is swingingly mounted on the motor key board and has two oppositely directed inclined faces 148, 149. On two pins 221 of the motor key board is shiftably mounted, by means of two slots 220, a slide 219, on the lower end of which is fixed a lateral lug 218 which by its face 217 abuts on the inclined face 216 of a pawl 213. The latter is loose on a pin 214 and under the action of a spring 215 engages one of two notches 211, 212 of coupling slide 147. The other end of spring 215 is fixed to slide 219 and urges face 217 thereof against the inclined face 216 of pawl 213 so that the latter engages the respective notch 211 or 212. The key shanks 141, 142 carry besides the pins 139, 140 further two pins 223 which project each into a slot 222 of slide 219. These slots 222 are provided with inclined faces in such a manner that upon depression of a key shank 141, 142 slide 219 is shifted upwardly before the respective pin 139 or 140 engages the appurtenant inclined face 148 or 149, whereby the abutting face 217 is lifted from the inclined face 216 of pawl 213. The coupling slide 147 is thus held still only yieldingly by pawl 213. Thus the locking effect of face 217 upon face 216 of part 213 is eliminated prior to the depression of one of the key shanks 141, 142. The enforced engagement of faces 216, 217 makes possible the actuation of slide 147 only by the depression of key shanks 141, 142 and maintains pinion 158 on shaft 160, described hereinafter, in fixed position.

An open slot 150, Figure 27, of coupling slide 147 engages a pin 151 of a toothed segment 153, Figures 27, 28, loose on a fixed pin 152 and in mesh with the teeth 154 of a double toothed segment 154, 155, the other teeth 155 co-operating with a pinion 156. The latter has rigid with it a wheel 157 which in turn is in mesh with a pinion 158. The latter is loose on a tube 159, Figure 28, and rigidly connected to a bevel wheel 181 which is in mesh with a planet bevel wheel 178. The latter is loose on a sleeve 180 and in mesh on its other side with a bevel wheel 177. Sleeve 180 is connected by claws to tube 159 which is loose on shaft 160 and on its other end carries a pinion 161, Figure 28, in mesh with a pinion 162 rigid with a cam groove drum 163.

The bevel wheel 177 is rigidly connected to a toothed segment 176 which in a manner to be described hereinafter abuts by a locking gap 176a on a locking face 174a of a locking segment 174, Figure 27. This segment is mounted on the extended hub 173 of a cam groove drum 171 which by a link 169 is connected at 170 to the kind-of-operation lever 38, Figures 28, 30, 32. Lever 38 is held locked in its position "addition" by the balance lever 121 being set to position "balance", whereby also bevel wheel 177 is locked against rotation through the intermediary of the members 169, 170, 173, 174, 176. Now the upward or downward motion of the coupling slide 147 caused by depression of the plus- or minus-blank key 141 or 142 is transmitted as rotary motion to bevel wheel 181 through the members 151 to 157. As bevel wheel 177 is locked as mentioned, the rotation of bevel wheel 181 results in the planet wheel 178 rolling on the stationary bevel wheel 177. The planet motion of wheel 178 is transmitted through the members 180, 159, 161, 162 to cam groove drum 163 in such a manner that according to whether the plus- or minus-key shank 141 or 142 is depressed, a rotation of drum 163 in clockwise or counterclockwise direction is caused.

The groove of drum 163 (Fig. 28a) is engaged by a roller 164 of the one arm 165a (Fig. 28) of a double lever 165 mounted on a shaft 194 which is shiftable in partitions of the machine frame. The other arm of lever 165 is bifurcated at 165b and embraces a shaft 196 so that lever 165 can be shifted but not rocked. On shaft 194 is fixed a plate 166 to which are rigidly connected the shiftable shafts of the balance mechanism, viz. the axle 13, tens transfer shaft 18, and total-taking shaft 167.

By the rotation of the cam groove drum 163 the plate 166 and the shafts 13, 18, 167 connected thereto are selectively shifted into adding or subtracting position according to depression either of key shanks 141 or 142. By setting the balance lever 121 to position "balance" the totalizing companion teeth 168 (Fig. 29) are rocked into the path of the tens teeth 1a or 2a of the counting wheels 1 and 2, respectively. The shaft 300 (Fig. 29) is rotatably controlled by the balance lever 121 by a transmission mechanism which is not shown. Levers 301, which are fixed to shaft 300, carry shaft 167. The totalizing fingers 168 are rotatable on shaft 167 and are connected to pins 304 by means of levers 302 and links 303. A rotation of shaft 300 in a clockwise direction brings the fingers 168 within the field of operation of tens teeth 1a or 2a. An analogous control of a total-taking mechanism is disclosed in my U. S. Patent No. 1,899,455, of February 28, 1933. The totalizing fingers 168 are mounted on a shaft 167 (Figs. 28, 29) which by the depression of the motor key 144 and one of the key shanks 141 or 142 coupled therewith is shifted in such a manner that the teeth 168 (Fig. 29) are opposite either the adding wheels 1 or subtracting wheels 2 according to whether the balance mechanism contains a positive or negative amount. By setting the balance lever 121 the kind of operation of the balance mechanism is selected in the manner described in my co-pending patent application Ser. No. 276,151, filed May 8, 1928 (now Patent No. 2,039,143, issued April 28, 1936). Such a control is also shown in the French patent to Krupp, No. 665,190, délivre April 30, 1929, Fig. 12. The balance lever 121, Figures 30 and 31, is loose on shaft 35 and connected by a link 225 to a cam groove drum 226 loose on the extended hub 173 of another cam groove drum 171, Figure 30, mounted on a shaft 172. The cam groove 226a of drum 226 is engaged by a roller 227 of a lever 228 shiftable on a shaft 160 and embracing by its bifurcated end a pin 231 of a lug 232a of a hub 232 shiftable on a shaft 61. Hub 232 has loosely mounted on it a pinion 233 and an actuating pinion 234 rigid with the latter. When the balance lever 121 is in position "addition", pinion 234 is opposite an actuating disc 236, while pinion 233 is opposite a tripping wheel 235. When lever 121 is set to position "balance", hub 232 is shifted in such a manner that pinion 234 is opposite another actuating disc 237, while pinion 233 is shifted into another plane of tripping wheel 235. The actuating or kind-of-operation discs 236, 237 and tripping wheel 235 are fixed in common on shaft 35.

The kind-of-operation discs 236, 237, Figure 31, are each formed with two gaps 236a, 236b and 237a, 237b, respectively, and with two locking faces 236c, 236d and 237c, 237d, respectively, which co-operate with the teeth and gaps of pinion 234. The tripping wheel 235 is formed with three groups of teeth A, B, S each consisting of two teeth. Group A is situated in the outer plane of wheel 235 and its teeth are so narrow as to co-operate with pinion 233 only when the latter has been shifted into this outer plane of wheel 235 by setting balance lever 121 to position "addition". The group of teeth S is located in the inner plane of wheel 235 and its teeth are so narrow as to co-operate with pinion 233 only when the latter is situated in the inner plane of wheel 235 according to the position "balance" of balance lever 121. Finally, the group of teeth B extends on both these planes and thus always co-operates with pinion 233. The groups of teeth A, B, S are so arranged on the periphery of wheel 235 that group A is located close in front of gap 236b, group S close in front of gap 237a, and group B close in front of the gaps 236a, 237b.

The driving shaft 35, wheel 235 and discs 236, 237 receive during each operation of the machine a full revolution. When the balance lever 121 is in position for "addition", the actuating pinion 234 is locked by locking face 236d. After shaft 35 has made a certain partial rotation, the teeth B strike pinion 233 and rock it with pinion 234 connected thereto so far that tooth 234a of pinion 234 engages gap 236a, whereby pinion 234 completes a quarter of revolution. By locking face 236c entering one of the gaps of pinion 234 the latter is locked until teeth A of wheel 235 impart a small rotation to pinion 233 by which tooth 234b of pinion 234 is brought to engage gap 236b which imparts to pinion 234 another quarter of revolution, whereupon the latter is locked again by locking face 236d. When balance lever 121 is set to position "balance", hub 232 is shifted to the left so that pinion 234 is located in the plane of disc 237 and pinion 233 in the plane where the teeth S of wheel 235 are located. Upon the rotation of shaft 35 the locking face 237c locks pinion 234 until the teeth S impart to pinion 233 a small rotation by which pinion 234 comes to engage gap 237a and thereby completes a quarter of revolution whereupon pinion 234 is again locked by locking face 237d. In the same way upon further rotation of driving shaft 35 the teeth B bring the pinion 234 into mesh with gap 237b which turns it farther by 90 degrees until it is locked again by locking face 237c. It will be seen therefrom that pinion 234 and therewith pinion 233 receive in each operation of the machine two successive quarters of revolution which however when lever 121 is set to "balance" take place at other instants than with lever 121 in position "addition".

Pinion 233 is permanently in mesh with a broad wheel 239 by which the rotations of pinion 233, that take place at different instants, are passed on, in order to rock the balance mechanism into and out of mesh with the differential wheels 19. The diameter of wheel 239 is two times that of the pinion 233, and therefore wheel 239 receives a one-quarter rotation for each one-half rotation of pinion 233. The broad wheel 239 is rotatable on a shaft 300 and meshes with a pinion 301 (Figs. 28, 30, 31, and 33) secured to shaft 160, and rotates pinion 301 one-half rotation for each one-quarter rotation of wheel 239. On the other end of shaft 160 is a gear 302 (Figs. 28 and 33) meshing with a pinion 303 rotatable on shaft 304. The gear 302 rotates pinion 303 one full rotation for each one-half rotation of pinion 302. Secured to the side of the pinion 303 is a cam 305, which engages two rollers 306 and 307 of an arm 308, secured to the shaft 309 (Figs. 29 and 33). The shaft 309 carries the balance mechanism frame and when the shaft is rocked by cam 305, the balance mechanism is rocked into and out of mesh with the differential wheels 19. As pointed out above, the gear ratio of the train of gears for rotating cam 305 is such that one-half rotation of the pinion 233 will rotate cam 305 one complete rotation, and the cam 305, therefore, rocks the balance mechanism into and out of mesh with the differential actuators once during each machine operation. The gaps 236a, 236b and 237a, 237b are staggered in such a manner that the balance mechanism is coupled with the amount differential wheels 250 in addition operations after the positioning of the amount differential wheels and is thrown out of mesh after the removal thereof, but that in balancing operations the balance mechanism is thrown in previous to the positioning of the amount differential wheels and is thrown out after they have been positioned.

The setting of the balance lever 121 to position "balance" thus causes that in the first half of a balance operation, the balance mechanism is in mesh with the amount differential wheels 250 during the positioning motion of the latter and is zeroized thereby. Thereupon the balance mechanism is thrown out of mesh, and a kind-of-operation mechanism for the totalizers, Figures 30 and 32, which is influenced by the kind-of-operation lever 38 and designed in a similar manner as described, effects that now the totalizer selected by the depressed shank 115 or 116 is coupled with the amount differential wheels 250 during the restoring motion of the latter, the total taken from the balance mechanism being transmitted to the coupled totalizer for positive or negative new balances.

The cam groove drum 163, Figure 28, is turned in clockwise or counterclockwise direction by depression of the motor key 144, as described, according to whether the plus or minus key shank 141 or 142 is being coupled with the motor key 144, whereby the several shafts of the balance mechanism are shifted in such a manner that either the adding or the subtracting wheels come to act as counting wheels. Now when an intermediate total or a grand total is to be taken from one of the totalizers, the balance mechanism must not be coupled with the amount differential wheels 250. Furthermore, the riders 14 must be thrown out of mesh with the internal teeth of the adding and subtracting wheels. This result is obtained in the manner hereinafter described by setting the kind-of-operation lever 38 to one of the total-taking positions, whilst the balance lever 121 remains in position of rest.

The kind-of-operation lever 38 is connected by link 169, Figures 28, 30, 32, to the eye 170 of the above-described cam groove drum 171 loose on shaft 172. The extended hub 173 of drum 171 has rigid on it a toothed segment 174, Figure 27, having two locking faces 174a and 174b separated from one another by a passage gap 174c. Beside gap 174c a short arcuate rack 175, which has two teeth, is fixed on the segment 174. In the adding position the locking face 174a of segment 174 engages the locking gap 176a of segment 176 and locks the latter against rotation. When the kind-of-operation lever 38 is set from position "addition" to position "intermediate total", segment 174 is turned correspondingly, whereby the teeth of rack 175 come into mesh with segment 176 and rock it by 60 degrees, until the locking face 174b engages gap 176b and anew locks segment 176. The latter is rigidly connected to the bevel wheel 177, Figure 28, but is loosely mounted on shaft 160. Bevel wheel 177 is in mesh with the planet bevel wheel 178 which as described is in connection with the coupling slide 147 by the members 181 and 150 to 158. Slide 147 is controlled in the described manner by the pins 139, 140 of the key shanks 141, 142 and is prevented from motion as long as none of the keys 141, 142 is depressed, as pawl 213, Figure 27, is held engaged in one of the notches 211, 212 of slide 147. Hence, also the bevel wheel 181 which is connected to slide 147 by the members 150 to 158, is prevented from rotation. Consequently upon lever 38 being set, the planet wheel 178 rolls on bevel wheel 181, whereby sleeve 180 and thus tube 159 is turned accordingly. This rotation is transmitted to pinion 162 by the pinion 161 rigid with tube 159, so that also the drum 163 is turned which as described is rigidly connected to pinion 162. By this rotation of drum 163 roller 164 arrives in a straight annular section of groove 163a whereby the plate 166 and the rider axle 13 rigid therewith is shifted in such a manner that the riders 14 are disengaged from the internal teeth of the counting wheels 1, 2. It is immaterial whether in the subsequent depression of the motor key 144 the plus or minus key shank 141 or 142 is also depressed, because by the rotary displacement of drum 163 caused by the depression of one of the keys 141, 142 plate 166 is not shifted, as roller 164 glides in the above-mentioned straight annular section 163a of cam 163. Consequently, the balance mechanism is not actuated when the kind-of-operation lever 38 is in the position for taking an intermediate total or grand total, independently of the depression of a plus or minus key shank.

The kind of operation of the totalizers allotted to the keys 202, 203, 204, 205, 206, 207, is controlled by the kind-of-operation lever 38. This controlling mechanism operates in a manner similar to that of the balance mechanism, the rotation of cam groove drum 171 by lever 38 through link 169 causing a shifting motion of pinion 233', the mechanism being constructed fundamentally as described in my co-pending patent application Ser. No. 276,151, filed May 8, 1928 (now Patent No. 2,039,143, issued April 28, 1936). The members of the totalizer kind-of-operation controlling mechanism are denoted by the same reference letters, but with indices, as those of the kind-of-operation mechanism for the balance mechanism, Figures 30 and 32. These corresponding members are: roller 227', lever 228', pin 231', hub 232', pinion 233', actuating pinion 234', tripping wheel 235'. According to the set position of lever 38 the actuating pinion is set opposite one of the appurtenant actuating discs 240, 241, 242, 243.

The actuating discs 240, 241, 242 for addition, "taking intermediate total" and "taking grand total" are each formed with two gaps staggered in such a manner that pinion 234' has imparted to it at different times two quarters of revolution according to which of the discs 240, 241, 242 is opposite to it. These quarters of revolution are imparted as explained in connection with the pinion 233, for the coupling and uncoupling of the totalizers, by means of the pinion 233' and a broad pinion 239' and are arranged so as to perform these functions at the proper intervals. In this manner the coupling and uncoupling of the totalizers takes place at different times in the operations "addition", "taking an intermediate total", and "taking the grand total" according to whatever position the pinions 233' and 234' are moved to by adjustment of the kind-of-operation lever 38.

A further notch denoted by "duplicate", Figure 1, is provided for the kind-of-operation lever 38, to which notch the latter is set when supplemental bookings are to be printed, but nothing is to be added into the totalizers. By this setting the actuating pinion 234' is shifted in a manner so as to be opposite disc 243 which has no gap but the entire circumference of which forms a locking face. In this case during the rotation of driving shaft 35 pinion 234' remains locked, so that also no actuation for the coupling motion of the totalizers takes place. Therefore, when lever 38 is set to "duplicate", no totalizer is thrown in, although the respective totalizer key is down, but only the balance mechanism; however the character corresponding to the respective totalizer is printed.

The described machine operates as follows:

In a normal booking operation the old balance of an account is set up on the keyboard, prior to the first operation of the machine, by depression of amount keys 201 and of one of the keys 204 (old balance +) or 205 (old balance —). According to which of these two keys is depressed, the actuating slide 123 of the keyboard of the controlling totalizers, Figure 25, is raised or lowered, whereby the pawls 136, 137 of the controlling slide 133, Figure 26, are so set in the motor key board that either the plus key shank 141 or the minus key shank 142 is connected to the motor key 144. By depressing the motor key the key shank concerned 141 or 142 is likewise depressed and the rider axle 13 of the balance mechanism, which axle by the members 148 to 159, Figure 27, and 159 to 166, Figure 28, is positively connected to the coupling slide 147, is shifted accordingly to the adding or subtracting position and the operation is tripped.

At the beginning of the machine operation the amount differential wheels 250 are positioned in accordance with the depressed amount keys 201 and the totalizer A C or A D belonging to the depressed totalizer key 204 or 205 is selected. Thereupon this totalizer and the balance mechanism is coupled by the actuating wheels 16 engaging the tens transfer wheels 19, Figure 29. Upon return of the amount differential wheels 250 the set amount is transmitted to the coupled totalizer A C or A D and to the balance mechanism.

During the second period of the booking operation which may consist in one or more machine operations the amount paid in or paid out are introduced in the machine, to which end after the depression of the respective amount keys 201 one of the keys "Paid in" or "Paid out", viz. 206 or 207, is depressed. According to which of these keys has been depressed, either the keys 202 of the plus-row or the keys 203 of the minus-row are released for depression in a manner not shown, whereupon one of them is depressed. By the depression of one of the keys 206, 207 the plus or minus key shank 141 or 142 is again coupled with the motor key 144, if it was not already coupled during the previous operation, so that upon depression of the motor key 144 either the adding or the subtracting wheels of the balance mechanism are coupled with the actuating wheels 16 by a corresponding shifting motion of the rider axle 13. At the beginning of the operation of the machine, the selection of the totalizer takes place, the respective plus or minus totalizer being selected by the depressed key of one of the rows 202, 203, while the totalizer for paid in—or paid out—amounts is selected by depression of one of the keys 206, 207. After the amount differential wheels have been positioned under control of the depressed amount key 201, the selected totalizers and the adding or subtracting wheels of the balance mechanism are engaged with the amount differential wheels. Upon return of the amount differential wheels 250, the amount standing thereon is transmitted to the two coupled totalizers and to the balance mechanism, in which operation tens transfers may be prepared in one or more orders. Thereupon the tens transfers prepared in the balancing operation are executed by the first full revolution of the step shaft 20a and the first partial rotation of step shaft 20b.

The second revolution or partial revolution of the step shafts remains always without effect if no passage from 9 to 0 has taken place in the counting wheel of the highest order. But if such a passage takes place in this counting wheel, the tens transfer produced in the highest order is transmitted by shaft 18 to the sleeve 80 which is disposed in front of the lowermost order, Figure 2.

When the capacity of the balance mechanism is exceeded in positive or negative sense, the second revolution and partial rotation, respectively, of the step shafts 20a, 20b remains likewise without effect, as the locking arm 94 is opposite one of the cams 92, 93 and thus prevents a motion of the tens coupling member 25' disposed in front of the lowermost order, Figures 8, 22.

When a passage from positive to negative or from negative to positive condition occurs in the balance mechanism, the tens coupling member 25' in front of the lowermost order is turned 45 degrees by the tens transfer preparation in the highest order, as the locking arm 94 is not opposite one of the cams 92, 93, Figures 7, 8, 22, 2, so that in the second revolution or partial revolution, respectively, of the step shafts 20a, 20b a supplemental unit is transmitted to the lowermost order which is farther transferred as tens transfer up to that order in which the last tens passage is required. In this way the difference of one unit is compensated for which results from the change of sign by the change of the counting wheels when the balance is to be taken.

By the transmission of the tens transfer preparation from the highest to the lowermost order in this case the next following cam 92 or 93 has been positioned opposite the locking arm 94, so that upon the capacity of the balance mechanism being exceeded, a transmission of the tens transfer preparation from the highest to the lowermost order can no longer take place, but only upon a new change of the sign of the amount contained in the balance mechanism.

By the rotation of the cam 92 or 93 by 90 degrees the cam groove disc 98 has been turned 60 degrees, Figure 24, whereby the controlling slide 108 of the balance key board has been set in such a manner that either the plus or the minus key shank, 115 or 116, has been coupled with the balance lever 121.

In order to strike the new balance the balance lever 121 is set to position "balance", while the kind-of-operation lever 38 remains in the position "addition". In this position all levers and keys are locked except the motor key, by mechanism not shown herein. By the setting of the balance lever 121 the coupled key shank "New balance +", 115, or "New balance —" is depressed, Figure 24, whereby through slide 123, Figure 25, the controlling slide 133, Figure 26, of the motor key board couples either the plus or the minus key shank 141, 142 with the motor key 144. By the depression of the latter now the rider axle 13 is shifted to adding or subtracting position through the members 147 to 166, according to whether key shank 141 or 142 has been depressed, and the operation of the machine is tripped. At the beginning of the machine operation the coupling of the balance mechanism and the throwing-in of the fingers 168, Figure 29, takes place to zeroize the balance mechanism. After the zeroizing has been completed, the balance mechanism is uncoupled and the totalizer for positive or negative new balances selected by the depressed key shank 115 or 116 is coupled. Upon return of the amount differential wheels 250 the amount taken from the balance mechanism is transmitted to this totalizer.

When the total is to be taken from one of the totalizers the kind-of-operation lever 38 is set to one of the total taking positions, whereby the balance lever 121, which is in adding position, and all keys except the motor key 144 are locked by mechanism not shown, but the totalizer levers 208, 209, 210 are released. By setting one of these levers the corresponding totalizer is selected in the manner disclosed in my aforementioned application, Serial No. 276,151. When the kind-of-operation lever 38 is set from adding position to intermediate total taking position, the rider axle 13 of the balance mechanism is shifted, through the members 169 to 180 and 159 to 166, Figure 28, in such a manner that the riders 14 are disengaged from the wheels 1, 2. The shifting motion of the rider axle 13 which normally is caused by depression of the motor key 144, is prevented in this case by roller 164 gliding without effect in the annular section of groove 163a of drum 163, so that the riders 14 remain out of engagement with the wheels 1, 2. The depression of the motor key 144 thus trips merely the machine operation by which the total is taken from the selected totalizer, in the manner fully disclosed in my United States Patent, No. 1,899,455.

When a duplicate or supplemental booking operation is to be made, the kind-of-operation lever 38 is set to position "duplicate" whereby the actuating disc 243 comes into operative position. This results in the fact that in spite of the depression of totalizer keys no actuation of the totalizers takes place and that only the balance mechanism is thrown in for the entry of the duplicate booking and that the character corresponding to the depressed totalizer key is printed.

What I claim and desire to secure by Letters Patent is:—

1. In a book-keeping machine, a plurality of amount keys, a balance mechanism comprising adding and subtracting wheels, a differential mechanism cooperating with said wheels whereby old balances and amounts paid in and paid out may be entered and new balances calculated, a balance lever associated with said balance mechanism, a motor release key for said machine, a selecting device operable by said motor release key, and means controlled by the balance mechanism and responsive to the setting of said balance lever for balancing operations, for adjusting said selecting device in accordance with the algebraic condition of said balance mechanism whereby the depression of said motor release key effects the selection of either the adding or subtracting wheels of the balance mechanism for operation by said differential mechanism.

2. The combination claimed in claim 1 wherein said last mentioned means comprises a pair of actuating pawls, a key shank associated with each of said pawls, means for selectively engaging one of said pawls with its associated key shank in accordance with the algebraic condition of the balance mechanism, an actuating lever selectively cooperating with the pawl in engagement with its key shank, and connecting means between said balance lever and said actuating lever.

3. In a book-keeping machine, a plurality of amount keys, a balance mechanism comprising adding and subtracting counting wheels, a differential mechanism cooperating with said wheels whereby old balances and amounts paid in and paid out may be entered and new balances calculated, a balance lever associated with said balance mechanism, a motor release key for said machine, a selecting device associated with said motor release key, means, responsive to the setting of said balance lever for balancing, for adjusting said selecting device in accordance with the condition of said balance mechanism whereby upon the depression of said motor release key the counting wheels of the proper sign representing the condition of the balance mechanism are selected for operation with said differential mechanism, said last mentioned means comprising a pair of actuating pawls, a key shank associated with each of said pawls, means for selectively engaging one of said pawls with its associated key shank in accordance with the condition of the balance mechanism, an actuating lever selectively cooperating with the pawl in engagement with its key shank, connecting means between said balance lever and said actuating lever whereby upon the setting of said balance lever for balancing, one of said key shanks is depressed, a slide cooperating with said key shanks, and means controlled by the movement of said slide for positioning said selecting device associated with said motor release key, and additional means for actuating said last mentioned slide comprising manipulative means for entering old balances and amounts paid in and paid out, cooperating with said slide.

4. In a book-keeping machine, a balance mechanism comprising adding and subtracting wheels, a motor release key for said machine, a pair of key shanks associated with said motor release key, an actuating pawl associated with each key shank, means for selectively engaging one of said pawls with its associated key shank in accordance with the condition of said balance mechanism, and means for actuating said engaged key shank by the depression of said motor release key.

5. The combination claimed in claim 4 wherein said last mentioned means comprises a pin upon said motor release key so positioned as to engage a part of the active pawl.

6. In a book-keeping machine, a balance mechanism comprising adding and subtracting wheels, a differential mechanism cooperating with said wheels, a motor release key for said machine, a pair of key shanks associated with said motor release key, an actuating pawl associated with each key shank, means for selectively engaging one of said pawls with its associated key shank in accordance with the condition of said balance mechanism, means for actuating said engaged key shank by the depression of said motor release key, a positioning slide associated with said key shanks, and a transmission mechanism actuated by said slide for positioning said adding or subtracting wheels of said balance mechanism for operation with said differential mechanism.

7. In a book-keeping machine, a plurality of amount keys, a balance mechanism comprising adding and subtracting wheels, a differential mechanism cooperating with said wheels whereby old balances and amounts paid in and paid out may be entered and new balances calculated, a balance lever associated with said balance mechanism, a motor release key for said machine, a pair of key shanks associated with said motor release key, an actuating pawl associated with each key shank, means for selectively engaging one of said pawls with its associated key shank in accordance with the condition of said balance mechanism, means for actuating said engaged key shank by the depression of said motor release key, a positioning slide having oppositely inclined faces associated with said key shanks, a pawl for yieldingly locking said slide, an auxiliary slide cooperating with said pawl for rigidly locking said slide, inclined faces upon said auxiliary slide, auxiliary pins upon said key shanks cooperating with said inclined faces to disable said rigid locking effect of said auxiliary slide in the first stage of the depression of said engaged key shank, and a pin upon each of said key shanks for selectively striking said inclined faces of said positioning slide to actuate the slide.

8. In a book-keeping machine, a plurality of amount keys, a balance mechanism comprising adding and subtracting wheels of a plurality of orders, a differential mechanism cooperating with said wheels whereby old balances and amounts paid in and paid out may be entered and new balances calculated, a tens transfer mechanism associated with said balance mechanism comprising a shaft, a tens transfer member rigidly mounted upon said shaft in the highest order of said adding and subtracting wheels, a tens coupling member rotatably mounted upon said shaft in advance of the lowermost order of said wheels, means responsive to a change of sign in the balance mechanism in a calculating operation for transmitting a setting movement to said member by said rigidly mounted member, and means for blocking said effect of said rigidly mounted transfer member when the capacity of said balance mechanism exceeds itself in a positive or negative sense.

9. In a book-keeping machine, a plurality of amount keys, a balance mechanism comprising adding and subtracting wheels of a plurality of orders, a differential mechanism cooperating with said wheels whereby old balances and amounts paid in and paid out may be entered and new balances calculated, a tens transfer mechanism associated with said balance mechanism, a member disposed in the highest order of said adding and subtracting wheels adapted to be selectively actuated by the passage of said wheels from 9 to 0 or from 0 to 9, a tens coupling member mounted coaxially with said first mentioned member in advance of the lowermost order of said wheels, and means for transmitting the actuating movement of said first mentioned member to said tens coupling member for preparing the supplying of a supplementary unit to said lowermost order if said passage represents a change of sign in the balance mechanism in a calculating operation, and for blocking the transmission of said movement if said passage represents an exceeding of the capacity of either said adding or subtracting wheels of said balance mechanism.

10. In a book-keeping machine, a plurality of amount keys, a balance mechanism comprising adding and subtracting wheels of a plurality of orders, a differential mechanism cooperating with said wheels whereby old balances and amounts paid in and paid out may be entered and new balances calculated, a tens transfer mechanism associated with said balance mechanism comprising a shaft, a companion tens tooth rigidly mounted upon said shaft in the highest order of said adding and subtracting wheels, a tens coupling member rotatably mounted upon said shaft in advance of the lowermost order of said wheels, means responsive to a passage from 9 to 0 or from 0 to 9 in the highest order of said wheels to impart a rotating motion to said shaft, means for blocking the transmission of said motion to said tens coupling member if said passage represents an exceeding of the capacity of either said adding or subtracting wheels of said balance mechanism in a calculating operation, and for releasing the transmission of said motion to prepare the transmission of a supplementary unit to said tens coupling member if said passage represents a change of sign in the balance mechanism.

11. In a book-keeping machine, a plurality of amount keys, a balance mechanism comprising adding and subtracting wheels of a plurality of orders, a differential mechanism cooperating with said wheels whereby old balances and amounts paid in and paid out may be entered and new balances calculated, a balance lever associated with said balance mechanism, a motor release key for said machine, a selecting device associated with said motor release key, means actuated by the setting of said balance lever for balancing, for adjusting said selecting device in accordance with the condition of said balance mechanism, a tens transfer mechanism associated with said balance mechanism, comprising a shaft, a tens transfer member rigidly mounted upon said shaft in the highest order of said adding and subtracting wheels, a tens coupling member rotatably mounted upon said shaft in advance of the lowermost order of said wheels, means responsive to a change of sign in the balance mechanism in a calculating operation for transmitting a setting movement to said tens coupling member by said rigidly mounted transfer member, said last mentioned means adapted to simultaneously adjust said first mentioned means for actuation by said balance lever, and means for blocking said effect of said rigidly mounted transfer member when the capacity of said balance mechanism exceeds itself in a positive or negative sense.

12. The combination claimed in claim 11 wherein said first mentioned means consists of a pawl and key shank assembly.

13. In a book-keeping machine, a plurality of amount keys, a balance mechanism comprising adding and subtracting wheels of a plurality of orders, a differential mechanism cooperating with said wheels whereby old balances and amounts paid in and paid out may be entered and new balances calculated, a plurality of totalizers comprising controlling totalizers for accumulating new positive and negative balances, a balance lever associated with said balance mechanism, a motor release key for said machine, a selecting device associated with said motor release key, means actuated by the setting of said balance lever for balancing, for adjusting said selecting device in accordance with the condition of said balance mechanism, a tens transfer mechanism associated with said balance mechanism comprising a shaft, a companion tens tooth rigidly mounted upon said shaft in the highest order of said adding and subtracting wheels, a tens coupling member rotatably mounted upon said shaft in advance of the lowermost order of said wheels, means responsive to a passage from 9 to 0 or from 0 to 9 in the highest order of said wheels to impart a rotating motion to said shaft, means for blocking the transmission of said motion to said tens coupling member if said passage represents an exceeding of the capacity of either said adding or subtracting wheels of said balance mechanism in a calculating operation, and for releasing the transmission of said motion to prepare the transmission of a supplementary unit to said tens coupling member if said passage represents a change of sign in the balance mechanism, said shaft in the latter case further serving to automatically adjust said first mentioned means for actuation by said balance lever to effect the adjustment of said selecting device associated with said motor release key and the selection of the totalizer for receiving the new positive or negative balance.

14. The combination claimed in claim 10 wherein said last mentioned means comprises a sleeve rotatable with said shaft, a torsional spring intermediate said sleeve and said tens coupling member, cooperating shoulders upon said sleeve and said member, two of said shoulders defining an angular gap and two of said shoulders normally maintained in abutting relationship by said spring, blocking means for said tens coupling member operative when said balance mechanism exceeds itself in a positive or negative sense whereby said sleeve is actuated by said shaft against the action of said spring over the space defined by said gap, and means for releasing said tens coupling member for a tens transfer preparatory movement so that when said balance mechanism undergoes a change in sign said member is actuated through said shaft, sleeve, and torsioned spring to move said member into position for the execution of a tens transfer operation.

15. The combination claimed in claim 10 wherein said last mentioned means comprises a sleeve rotatable with said shaft, a torsional spring intermediate said sleeve and said tens coupling member, cooperating shoulders upon said sleeve and said member, two of said shoulders defining an angular gap and two of said shoulders normally maintained in abutting relationship by said spring, blocking means for said tens coupling member operative when said balance mechanism exceeds itself in a positive or negative sense whereby said sleeve is actuated by said shaft against the action of said spring over the space defined by said gap, means for releasing said tens coupling member for a tens transfer preparatory movement so that when said balance mechanism undergoes a change in sign said member is actuated through said shaft, sleeve, and torsioned spring to move said member into position for actuation, a step shaft mounted adjacent said tens coupling member, a step disc mounted upon said step shaft, and an actuating tooth upon said step disc for executing a tens transfer movement in the lowermost order.

16. The combination claimed in claim 10 wherein said last mentioned means comprises a sleeve mounted upon said shaft, a longitudinal slot in said sleeve, a pin on said shaft engaging said slot whereby said sleeve partakes of the rotational movement of said shaft but not of its longitudinal movement, a torsional spring intermediate said sleeve and said tens coupling member, cooperating shoulders upon said sleeve and said member, two of said shoulders defining an angular gap, a gear wheel rigid with said tens coupling member, a toothed segment in mesh therewith, a pawl carried by said segment, a ratchet wheel engaged by said pawl, a plurality of laterally displaced cams on the body of said ratchet wheel, and a locking member cooperating with said cams for blocking said tens coupling member against movement, said locking member being displaceable in accordance with the sign of the wheels of the balance mechanism operated upon.

17. The combination claimed in claim 10 wherein said last mentioned means comprises a sleeve rotatable with said shaft, a torsional spring intermediate said sleeve and said tens coupling member, cooperating shoulders upon said sleeve and said member, two of said shoulders defining an angular gap, a gear wheel rigid with said tens coupling member, a toothed segment in mesh therewith, a pawl carried by said segment, a ratchet wheel engaged by said pawl, a plurality of laterally displaced cams on the body of said ratchet wheel, said cams in each laterally displaced plane being opposite each other and offset 90° angularly from the cams in the adjacent plane, and a locking arm cooperating with said cams laterally displaceable in accordance with the positive or negative sign of the old balances and amounts paid in and paid out which are entered in said balance mechanism.

18. The combination claimed in claim 10 wherein said last mentioned means comprises a sleeve rotatable with said shaft, a torsional spring intermediate said sleeve and said tens coupling member, cooperating shoulders upon said sleeve and said member, two of said shoulders defining an angular gap, a gear wheel rigid with said tens coupling member, a toothed segment in mesh therewith, a pawl carried by said segment, a ratchet wheel engaged by said pawl, a plurality of laterally displaced cams on the body of said wheel, said cams in each laterally displaced plane being opposite each other and offset 90° angularly from the cams in the adjacent plane, a locking arm cooperating with said cams laterally displaceable in accordance with the positive or negative sign of the entries which are made in said balance mechanism, said pawl adapted to actuate said ratchet wheel upon the actuation of said tens coupling member whereby one of said cams is disposed in the path of said blocking arm to prevent a repeated actuation of said tens coupling member upon the exceeding of the capacity of the balance mechanism in its changed condition.

19. In a book-keeping machine, a plurality of amount keys, a balance mechanism comprising adding and subtracting wheels of a plurality of orders, a differential mechanism cooperating with said wheels whereby old balances and amounts paid in and paid out may be entered and new balances calculated, a balance lever associated with said balance mechanism, a motor release key for said machine, a selecting device associated with said motor release key, a pawl and key shank assembly actuated by the setting of said balance lever for balancing, for adjusting said selecting device in accordance with the condition of said balance mechanism, a tens transfer mechanism associated with said balance mechanism comprising a shaft, a companion tens tooth rigidly mounted upon said shaft in the highest order of said adding and subtracting wheels, a tens coupling member rotatably mounted upon said shaft in advance of the lowermost order of said wheels, means responsive to a passage from 9 to 0 or from 0 to 9 in the highest order of said wheels to impart a rotating motion to said shaft, means for blocking the transmission of said motion to said tens coupling member if said passage represents an exceeding of the capacity of either said adding or subtracting wheels of said balance mechanism in a calculating operation, and for releasing the transmission of said motion to prepare the transmission of a supplementary unit to said tens coupling member if said passage represents a change of sign in the balance mechanism, said last mentioned means comprising a sleeve rotatable with said shaft, a torsional spring intermediate said sleeve and said tens coupling member, cooperating shoulders upon said sleeve and said member, two of said shoulders defining an angular gap, a gear wheel rigid with said tens coupling member, a toothed segment in mesh therewith, a pawl carried by said segment, a ratchet wheel engaged by said pawl, a plurality of laterally displaced cams on the body of said wheel, a mutilated pinion connected with said wheel, a cam groove drum actuated by said mutilated pinion upon the execution of said motion transmitted to said tens coupling member, a roller in said groove, connections between said roller and said pawl and key shank assembly for positioning said assembly for actuation by said balance lever to select the controlling totalizer for the new balance of changed sign, and to adjust said selecting device associated with said motor release key.

20. The combination claimed in claim 19 wherein the groove upon said cam groove drum has a triangular configuration, adapted to receive a 60° movement by a single actuation of said mutilated pinion, said 60° movement being sufficient to position said pawl and key shank assembly in its two alternative positions representing a positive or negative total in said balance mechanism.

21. In a book-keeping machine, a plurality of amount keys, a balance mechanism comprising adding and subtracting wheels of a plurality of orders, a differential mechanism cooperating with said wheels whereby old balances and amounts paid in and paid out may be entered and new balances calculated, a tens transfer mechanism associated with said balance mechanism comprising a two-part step-shaft allotted to said plurality of orders, a series of tens coupling members adjacent said step-shaft, a plurality of step discs mounted on said step-shaft adapted to actuate said tens coupling members, one of said step discs being disposed in each order of said balance mechanism below the highest, actuating teeth disposed upon the peripheries of said discs in successively offset angular relationship proceeding from the lowermost order, means for imparting a single revolution to one of said step-shaft parts in a machine cycle, and two revolutions to the other part, the discs upon said first mentioned part having a double set of actuating teeth thereupon.

22. In a book-keeping machine, a plurality of amount keys, a balance mechanism comprising adding and subtracting wheels of a plurality of orders, a differential mechanism cooperating with said wheels whereby old balances and amounts paid in and paid out may be entered and new balances calculated, a tens transfer mechanism associated with said balance mechanism comprising two independent shafts apportioned between the lower and the higher orders of said mechanism, actuating elements for executing tens transfer operations mounted upon said shafts, and means for imparting a single revolution to the shaft associated with the higher orders of the balance mechanism and a plurality of revolutions to the shaft associated with the lower orders of the balance mechanism.

23. In a book-keeping machine, a plurality of amount keys, a balance mechanism comprising adding and subtracting wheels of a plurality of orders, a differential mechanism cooperating with said wheels whereby old balances and amounts paid in and paid out may be entered and new balances calculated, a tens transfer mechanism associated with said balance mechanism comprising two independent shafts apportioned between the lower and the higher orders of said mechanism, actuating elements for executing tens transfer operations mounted upon said shafts, a tens transfer member disposed in advance of the lowermost order of said adding and subtracting wheels, means responsive to a change of sign in the balance mechanism in a calculating operation for transmitting a supplementary unit to said tens transfer member, means for blocking said transmitting effect when the capacity of the balance mechanism exceeds itself in a positive or negative sense, and means for imparting a single revolution to the shaft associated with the higher orders of the balance mechanisms and two revolutions to the shaft associated with the lower orders of the balance mechanism, whereby the actuating elements on said last-mentioned shaft may execute at the second revolution thereof the tens transfer operations necessitated by the transmission of a supplementary unit to said tens transfer member.

24. In a book-keeping machine, a plurality of amount keys, a balance mechanism comprising adding and subtracting wheels of a plurality of orders, a differential mechanism cooperating with said wheels whereby old balances and amounts paid in and paid out may be entered and new balances calculated, a tens transfer mechanism associated with said balance mechanism comprising two independent shafts apportioned between the lower and the higher orders of said mechanism, actuating elements for executing tens transfer operations mounted upon said shafts comprising a single actuating tooth upon each of the actuating elements associated with lower orders of said mechanism and two displaced actuating teeth upon each of the actuating elements associated with the higher orders of said mechanism, a tens transfer member disposed in advance of the lowermost order of said adding and subtracting wheels, means responsive to a change of sign in the balance mechanism in a calculating operation for transmitting a supplementary unit to said tens transfer member, means for blocking said transmitting effect when the capacity of the balance mechanism exceeds itself in a positive or negative sense, and means for imparting a single revolution to the shaft associated with the higher orders of the balance mechanisms and two revolutions to the shaft associated with the lower orders of the balance mechanism, whereby one of the actuating teeth upon each of the actuating elements associated with the higher orders of the balance mechanism may execute normal tens transfer operations and the other one of said actuating teeth upon said last-mentioned elements may execute the tens transfer operations necessitated by the transmission of a supplementary unit to said tens transfer member.

25. In a bookkeeping machine, a balance mechanism comprising a plurality of adding and subtracting wheels of a plurality of orders, means responsive to a change in sign in the balance mechanism for transmitting a supplementary unit to the selected counting wheel of the lowermost order, a plurality of successively stepped actuating means for effecting tens-transfer operations upon said counting wheels, means for driving said actuating means to execute one tens-transferring cycle of operation attendant the entry of amounts in said counting wheels, and to execute a second tens-transferring cycle attendant the transmission of the supplementary unit to the lowermost order and the tens-transfer requirements occasioned thereby.

26. In a bookeeping machine, a balance mechanism comprising a plurality of adding and subtracting wheels of a plurality of orders, means responsive to a change in sign in the balance mechanism for transmitting a supplementary unit to the selected counting wheel of the lowermost order, a plurality of successively stepped actuating means for effecting tens-transfer operations upon said counting wheels, a shaft for mounting said actuating means, driving means for imparting one revolution to said shaft to execute one tens-transferring cycle of operation attendant the entry of amounts in said counting wheels and a second revolution to execute a second tens-transferring cycle of operation attendant the transmission of the supplementary unit to the lowermost order and the tens-transfer requirements occasioned thereby.

27. In a bookeeping machine, a balance mechanism comprising a plurality of adding and subtracting wheels of a plurality of orders, means responsive to a change in sign in the balance mechanism for transmitting a supplementary unit to the selected counting wheel of the lowermost order, a plurality of successively stepped actuating discs for effecting tens-transfer operations upon said counting wheels, each of said discs having two actuating teeth, each tooth appurtenant a group of successively spaced teeth on said plurality of discs, a shaft for mounting said discs, and means for imparting a single revolution to said shaft during a machine operation whereby one tens-transferring cycle of operation attendant the entry of amounts in said counting wheels is executed by one of the groups of actuating teeth, and a second tens-transferring cycle of operation attendant the transmission of the supplementary unit to the lowermost order and the tens-transfer requirements occasioned thereby is executed by the second group of actuating teeth.

28. In a bookkeeping machine, a balance mechanism comprising a plurality of counting wheels of a plurality of orders, a plurality of successively stepped actuating means effecting tens-transfer operations upon said counting wheels, a plurality of shaft portions carrying said actuating means, and means for rotating said shaft portions on said actuating means, two rotations in each machine operation, said shaft portions rotating successively during each of said two rotations.

29. In a bookkeeping machine, a balance mechanism comprising a plurality of counting wheels of a plurality of orders, a plurality of successively stepped actuating means effecting tens-transfer operations upon said counting wheels, a plurality of shaft portions carrying said actuating means, each shaft portion allotted to a group of counting wheels of a plurality of orders, and an intermediate driving means for each shaft portion, each driving means adapted to successively execute two tens-transferring cycles in each machine operation.

30. In a bookkeeping machine, a balance mechanism comprising a plurality of adding and subtracting wheels of a plurality of orders, means responsive to a change in sign in the balance mechanism for transmitting a supplementary unit to the selected counting wheel of the lowermost order, a plurality of successively stepped actuating discs for effecting tens-transfer operations upon said counting wheels, a plurality of shaft portions for mounting said actuating discs with each shaft portion allotted to a group of counting wheels of a plurality of orders, one of said shaft portions carrying discs each having a single actuating tooth appurtenant a group of successively spaced teeth on said discs, another of said shaft portions carrying discs each having two actuating teeth with each tooth appurtenant a group of successively spaced teeth on said discs, means for imparting two revolutions to said first shaft portion and a single revolution to said second shaft portion during a machine operation to execute two tens-transferring cycles in said machine operation, with said shaft portions rotating successively during each of said cycles.

31. In a bookkeeping machine, a balance mechanism comprising a plurality of adding and subtracting wheels of a plurality of orders, means responsive to a change in sign in the balance mechanism for transmitting a supplementary unit to the selected counting wheel of the lowermost order, a plurality of successively stepped actuating discs for effecting tens-transfer operations upon said counting wheels, two independent shafts for mounting said actuating discs, one of said shafts being allotted to a group of counting wheels of the low orders and the other shaft being allotted to a group of counting wheels of the higher orders, said first one of said shafts carrying discs each having a single actuating tooth appurtenant a group of successively spaced teeth on said discs, said second one of said shafts carrying discs each having two actuating teeth with each tooth appurtenant a group of successively spaced teeth on said discs, means for imparting two revolutions to said first shaft and a single revolution to said second shaft during a machine operation, to execute two tens-transferring cycles in said machine operation, with said shafts rotating successively during each of said cycles.

32. In a bookkeeping machine, a balance mechanism comprising a plurality of adding and subtracting wheels of a plurality of orders, means responsive to a change in sign in the balance mechanism for transmitting a supplementary unit to the selected counting wheel of the lowermost order, a plurality of successively stepped actuating discs for effecting tens-transfer operations upon said counting wheels, two independent shafts for mounting said actuating discs, one of said shafts being allotted to a group of counting wheels of the low orders and the other shaft being allotted to a group of counting wheels of the higher orders, said first one of said shafts carrying discs each having a single actuating tooth appurtenant a group of successively spaced teeth on said discs, said second one of said shafts carrying discs each having two actuating teeth with each tooth appurtenant a group of successively spaced teeth on said discs, means for imparting two revolutions to said first shaft and a single revolution to said second shaft during a machine operation, the first revolution of said first shaft serving to execute one tens-transferring cycle of operation attendant the entry of amounts in said counting wheels, and the second revolution of said first shaft serving to execute a second tens-transferring cycle of operation attendant the transmission of the supplementary unit to the lowermost order and the tens-transfer requirements occasioned thereby.

33. In a bookkeeping machine, a balance mechanism comprising a plurality of adding and subtracting wheels of a plurality of orders, means responsive to a change in sign in the balance mechanism for transmitting a supplementary unit to the selected counting wheel of the lowermost order, a plurality of successively stepped actuating discs for effecting tens-transfer operations upon said counting wheels, a plurality of shaft portions for mounting said actuating discs with each shaft portion allotted to a group of counting wheels of a plurality of orders, one of said shaft portions carrying discs each having a single actuating tooth appurtenant a group of successively spaced teeth on said discs, another of said shaft portions carrying discs each having two actuating teeth with each tooth appurtenant a group of successively spaced teeth on said discs, means for imparting two revolutions to said first shaft portion and a single revolution to said second shaft portion during a machine operation whereby the actuating discs on said last-mentioned shaft portion effect one tens-transferring cycle of operation attendant the entry of amounts in said counting wheels by means of one of the groups of actuating teeth on said discs, and a second tens-transferring cycle of operation attendant said transmission of the supplementary unit to the lowermost order and the tens-transfer requirements occasioned thereby by means of the second group of actuating teeth on said discs.

34. In a bookkeeping machine, a plurality of amount keys, a balance mechanism comprising adding and subtracting wheels, a differential mechanism cooperating with said wheels whereby old balances and amounts paid in and paid out may be entered and new balances calculated, a manipulative balance control means, a motor release key for initiating add, subtract and balancing operations of said machine, and means, including mechanism operated by depression of said motor release key, and controlled by said balance mechanism and said manipulative balance control means for selecting either the adding or subtracting wheels of said balance mechanism for operation with said differential mechanism in machine operations involving a new balance cycle depending on the algebraic sign of said new balance.

35. In a bookkeeping machine, a plurality of totalizers, a balance mechanism comprising adding and subtracting wheels, a differential actuating mechanism cooperating with the adding or subtracting wheels of said balance mechanism, a mode-of-operation lever associated with said totalizers and adapted to be set into positions to control adding and total-taking operations, a motor release key for said machine, and a differential device, controlled by the depression of said motor release key, and the setting of said mode-of-operation lever, for controlling the operation of the balance mechanism by the differential actuating mechanism, so that when the mode of operation lever is in total taking position, said device causes said actuating mechanism to cooperate with neither said adding or subtracting wheels of the balance mechanism, and so that when the mode of operation lever is in adding position, said device causes the actuating mechanism to cooperate with the appurtenant adding or subtracting wheels thereof.

36. The combination claimed in claim 35 wherein the cooperation between the actuating mechanism and the adding and subtracting wheels of the balance mechanism is effected by a rider element for actuating said wheels.

37. In a machine of the class described, the combination of a totalizer adapted for additions and subtractions and including adding and subtracting wheels, differential actuators for said totalizer, means for moving said totalizer into and out of operative relation with said differential actuators, means, including a shiftable selector member, for determining the direction of rotation of said totalizer wheels by said actuators, setting means adapted to be adjusted to different positions corresponding respectively to positive and negative totals, means controlled by the totalizer and operated upon a change of the sign of the total therein for adjusting said setting means to different positions, a manipulative member, a slidable means differentially positionable with respect to said manipulative member, means for positioning said slidable means in correspondence with the position of said setting means, and means, operable by said manipulative member through said slidable means, for shifting said selector member to a position corresponding to that of the setting means.

38. In a machine of the class described, the combination of a totalizer adapted for additions and subtractions and including adding and subtracting wheels, differential actuators for said totalizer, means for moving said totalizer into and out of operative relation with said differential actuators, means, including a shiftable selector member, for determining the direction of rotation of said totalizer wheels by said actuators, setting means adapted to be adjusted to different positions corresponding respectively to positive and negative totals, means controlled by the totalizer and operated upon a change of sign of the total therein for adjusting said setting means to different positions, a manipulative member operable to adjust certain elements of the machine to positions for taking totals, a pair of members with respect to which said setting means is differentially positionable to select one of said pair of members for operation by said manipulative member, and means for shifting the selector member controlled by means selectively operable by one of said pair of members, whereby, when said shifting means is actuated, the selector member will be positioned correspondingly to the selective operation of said pair of members in accordance with the position of said setting means.

39. In a machine of the class described, the combination of a totalizer adapted for additions and subtractions and including adding and subtracting wheels, differential actuators for said totalizer, means for moving said totalizer into and out of operative relation with said differential actuators, means, including a shiftable selector member, for determining the direction of rotation of said totalizer wheels by said actuators, a setting means adapted to be adjusted to different positions corresponding respectively to positive and negative totals, means controlled by the totalizer and operated upon a change in the sign of the total therein for adjusting said setting means to different positions, a manipulative member operable to adjust certain elements of the machine to positions for taking totals, a pair of members with respect to which said setting means is differentially positionable to select one of them for operation by said manipulative member, and means for causing an operation of the machine and for shifting the selector member controlled by means selectively operable by one of said pair of members, whereby, when said shifting means is actuated, the selector member will be positioned correspondingly to the selective operation of said pair of members in accordance with the position of said setting means.

40. In a machine of the class described, the combination of a totalizer adapted for additions and subtractions and including adding and subtracting wheels, differential actuators for said totalizer, means for moving said totalizer into and out of operative relation with said differential actuators, means, including a shiftable selector member, for determining the direction of rotation of said totalizer wheels by said actuators, a slidable means adapted to be adjusted to different positions corresponding respectively to positive and negative totals, means controlled by the totalizer and operated upon a change of sign of the total therein for adjusting said slidable means to a different position, a manipulative element operable to adjust certain elements of the machine to positions for taking totals, a pair of selectively depressible key shanks with respect to which said slidable means is differentially positionable to select one of said pair of key shanks for depression by said manipulative member, and means for causing an operation of the machine and for shifting the selector member controlled by means selectively operable by one of said pair of key shanks, whereby, when said shifting means is actuated, the selector member will be positioned correspondingly to the selective operation of said pair of key shanks in accordance with the position of said slidable means.

41. In a machine of the class described, the combination of a totalizer adapted for additions and subtractions and including adding and subtracting wheels, differential actuators for said totalizer, means for moving said totalizer into and out of operative relation with said differential actuators, means, including a shiftable selector member, for determining the direction of rotation of said totalizer wheels by said actuators, a "fugitive 1" mechanism operable to insert a "fugitive 1" in said totalizer, a setting means adapted to assume either of two positions, means actuated by said "fugitive 1" mechanism whenever it is operated to insert a "fugitive 1" for controlling the position assumed by said setting means, a manipulative member, a slidable means differentially positionable with respect to said manipulative member, means for positioning said slidable means to correspond with the positioning of said setting means, and means operable by said manipulative member through said slidable means for shifting said selector member to a position corresponding to that of the setting means.

42. In a machine of the class described, the combination of a totalizer adapted for additions and subtractions and including adding and subtracting wheels, differential actuators for said totalizer, means for moving said totalizer into and out of operative relation with said differential actuators, means, including a shiftable selector member, for determining the direction of rotation of said totalizer wheels by said actuators, a "fugitive 1" mechanism operable to insert a "fugitive 1" into said totalizer, a setting means adapted to assume either of two positions, means actuated by said "fugitive 1" mechanism whenever it is operated for controlling the adjustment of said setting means to a different position, a manipulative member operable to adjust elements of the machine to positions for taking totals, a pair of members with respect to which said setting means is differentially positionable to select one of said pair of members for operation by said manipulative member, and means for shifting the selector member controlled by means selectively operable by one of said pair of members, whereby, when said shifting means is actuated, the selector member will be positioned correspondingly to the selective operation of said pair of members in accordance with the position of said setting means.

43. In a machine of the class described, the combination of a totalizer adapted for additions and subtractions and including adding and subtracting wheels, differential actuators for said totalizer, means for moving said totalizer into and out of operative relation with said differential actuators, means including a shiftable selector member for determining the direction of rotation of said totalizer wheels by said actuators, a "fugitive 1" mechanism operable to insert a "fugitive 1" in said totalizer, a setting means adapted to assume either of two positions, means actuated by said "fugitive 1" mechanism whenever it is operated for controlling the adjustment of said setting means to different positions, a manipulative member operable to adjust elements of the machine to positions for taking totals, a pair of members with respect to which said setting means is differentially positionable to select one of said pair of members for operation by said manipulative member, and means for causing an operation of the machine and for shifting the selector member controlled by means selectively operable by one of said pair of members, whereby, when said shifting means is actuated, the selector member will be positioned correspondingly to the selective operation of said pair of members in accordance with the position of said setting means.

44. In a machine of the class described, the combination of an add and subtract totalizer having adding wheels and subtracting wheels, differential actuators therefor, means to engage the totalizer with the actuators for adding, subtracting, and the taking of positive and negative totals, a selector means shiftable to select either the adding or subtracting wheels, and means including a plurality of manipulative devices sequentially operable to cause shifting of the selector means to select the subtracting wheels for negative totals and to initiate a negative total taking operation, the operation of one of said manipulative devices controlling the actual shifting of the selector means by the other manipulative device.

ERNST BREITLING.

CERTIFICATE OF CORRECTION.

Patent No. 2,052,444. August 25, 1936.

ERNST BREITLING.

It is hereby certified that error appears in the printed specification of the above numbered patent requiring correction as follows: Page 2, first column, lines 12 and 15, for the word "position" read positions; page 3, first column, line 48, after "1930," insert the words and comma now patent No. 1,978,930, issued on October 30, 1934, ; line 52, beginning with "Together" strike out all to and including "order" in line 59 and insert instead The shaft 18 is shifted with the rider axle 13, Figures 2 and 3, on constrictions 22 of which are rotatably, but not shiftably, mounted the companion tens teeth 23 (one for each denominational order) in such a manner as always to be opposite a corresponding rider 14 and its companion wheels 1 or 2. When a wheel 1 or 2 in any order passes from 9 to 0; page 4, first column, line 12, after the word and comma "Therefore," insert upon; line 44, strike out "the" first occurrence; and second column, line 60, for "piston" read pinion; page 9, second column, line 61, after "depressed" insert key; page 11, first column, line 12, for "amount" read amounts; page 12, first column, line 24, claim 1, after "means" insert a comma; page 16, first column, line 27, claim 28, for "on" read for; and that the said Letters Patent should be read with these corrections therein that the same may conform to the record of the case in the Patent Office.

Signed and sealed this 1st day of December, A. D. 1936.

Henry Van Arsdale (Seal) Acting Commissioner of Patents.